United States Patent
Sun et al.

(10) Patent No.: US 11,817,929 B2
(45) Date of Patent: Nov. 14, 2023

(54) CHANNEL STATE INFORMATION MEASUREMENT METHOD AND APPARATUS AND NETWORK SIDE DEVICE

(71) Applicant: Huawei Technologies Co., Ltd., Shenzhen (CN)

(72) Inventors: Yunfeng Sun, Shanghai (CN); Guibao Li, Xi'an (CN); Chenhong Lu, Shenzhen (CN); Qunfang Lou, Shanghai (CN); Zhiying Wang, Shanghai (CN); Feng Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 17/484,936

(22) Filed: Sep. 24, 2021

(65) Prior Publication Data

US 2022/0014250 A1 Jan. 13, 2022

Related U.S. Application Data

(63) Continuation of application No. PCT/CN2020/080580, filed on Mar. 23, 2020.

(30) Foreign Application Priority Data

Mar. 25, 2019 (CN) .......................... 201910227899.3

(51) Int. Cl.
*H04B 7/06* (2006.01)
*H04L 5/00* (2006.01)
*H04W 24/08* (2009.01)

(52) U.S. Cl.
CPC ......... *H04B 7/0626* (2013.01); *H04L 5/0048* (2013.01); *H04W 24/08* (2013.01)

(58) Field of Classification Search
CPC .... H04B 7/0626; H04B 7/0478; H04B 7/024; H04B 7/0639; H04B 7/0632;
(Continued)

(56) References Cited

U.S. PATENT DOCUMENTS 9,025,487 B2   5/2015 Hugl et al.
10,390,352 B2 * 8/2019 Kim .................... H04W 72/542
(Continued)

FOREIGN PATENT DOCUMENTS

CN    103095427 A    5/2013
CN    103546262 A    1/2014
(Continued)

OTHER PUBLICATIONS

AT&T, "NR-U design for initial access and mobility," 3GPP TSG RAN WG1 Meeting #94, Gothenburg, Sweden, R1-1809064, total 3 pages 3rd Generation Partnership Project, Valbonne, France (Aug. 20-24, 2018).

*Primary Examiner* — Brian T O Connor
(74) *Attorney, Agent, or Firm* — Leydig, Voit & Mayer, Ltd.

(57) ABSTRACT

A channel state information measurement method and apparatus and a network side device are described. The measurement method includes configuring, by a network side device, channel state information reference signal (CSI-RS) transmit information of M access points. The CSI-RS transmit information is used to indicate the M access points to periodically send a CSI-RS to a first user equipment at a preset interval. The preset interval is a time interval and/or a subband interval, and M is an integer greater than 1. The network side device obtains channel state information (CSI) corresponding to each of the M access points. The CSI corresponding to the access point includes first CSI, and the first CSI is information that is measured based on the
(Continued)

CSI-RS corresponding to the access point and fed back by the first user equipment.

18 Claims, 8 Drawing Sheets

(58) Field of Classification Search
CPC .. H04B 7/0452; H04B 17/318; H04B 7/0413; H04B 7/0456; H04L 5/0048; H04L 5/0053; H04L 5/0023; H04L 5/0035; H04W 24/08; H04W 24/10; H04W 24/02
See application file for complete search history.

(56) References Cited

U.S. PATENT DOCUMENTS

| | | | | |
|---|---|---|---|---|
| 10,505,608 B2* | 12/2019 | Kim | ...... | H04B 7/0617 |
| 10,523,296 B2* | 12/2019 | Liu | ...... | H04B 7/0478 |
| 11,159,292 B2* | 10/2021 | Kim | ...... | H04L 5/0023 |
| 11,202,217 B2* | 12/2021 | Kim | ...... | H04L 5/0057 |
| 11,206,069 B2* | 12/2021 | Yoon | ...... | H04W 48/10 |
| 2011/0032839 A1* | 2/2011 | Chen | ...... | H04B 7/024 |
| | | | | 370/252 |
| 2015/0223161 A1 | 8/2015 | Xiao et al. | | |
| 2016/0100384 A1 | 4/2016 | Etemad et al. | | |
| 2017/0223738 A1 | 8/2017 | Seo et al. | | |
| 2023/0198594 A1* | 6/2023 | Kim | ...... | H04L 5/0094 |
| | | | | 370/252 |

FOREIGN PATENT DOCUMENTS

| | | |
|---|---|---|
| CN | 103037395 B | 4/2015 |
| CN | 105471546 A | 4/2016 |
| CN | 106664729 A | 5/2017 |
| CN | 108370266 A | 8/2018 |
| WO | 2017061744 A1 | 4/2017 |
| WO | 2017196253 A1 | 11/2017 |
| WO | 2018228571 A1 | 12/2018 |
| WO | 2019019839 A1 | 1/2019 |
| WO | 2019212323 A1 | 11/2019 |

\* cited by examiner

CHANNEL STATE INFORMATION MEASUREMENT METHOD AND APPARATUS AND NETWORK SIDE DEVICE

CROSS-REFERENCE TO RELATED APPLICATIONS

This application is a continuation of International Application No. PCT/CN2020/080580, filed on Mar. 23, 2020, which claims priority to Chinese Patent Application No. 201910227899.3, filed on Mar. 25, 2019. The disclosures of the aforementioned applications are herein incorporated by reference in their entireties.

TECHNICAL FIELD

This application relates to the field of wireless communications technologies, and specifically, to a channel state information measurement method and apparatus and a network side device.

BACKGROUND

With rapid development of mobile internet and internet of things and emergence of all types of new services, mobile communication have experienced explosive growth in the past. Diversified services of the mobile internet and the internet of things bring convenience to people's lives and change their lifestyles, and also pose higher requirements and challenges to a mobile communications network.

To meet a requirement of rapid growth of mobile network data, in addition to increasing a spectrum bandwidth and using an advanced radio transmission technology to increase spectrum utilization, the most effective way to increase a capacity of a wireless system is still performing dense cell deployment to increase a spatial reuse rate, that is, performing dense deployment of low-power small base stations in indoor and outdoor hotspot areas, to form ultra-dense networking.

Through ultra-dense networking, although a path loss between a base station and a terminal is reduced, interference signals are increased. Consequently, the system becomes an interference-limited system. How to effectively eliminate and coordinate interference becomes a problem that needs to be resolved to improve a network capacity for ultra-dense networking.

In a long term evolution (LTE) release (R) 11, a coordinated multipoint transmission (CoMP) technology is introduced to expand network edge coverage and ensure quality of service (QoS) of an edge user. The core of the CoMP technology is: When the terminal is located in a cell border area, the terminal can simultaneously receive signals from a plurality of cells, and signals transmitted by the terminal can also be simultaneously received by the plurality of cells.

Application of the CoMP technology depends on that the terminal supports transmission mode (TM) 10. For TM 10, the terminal supports features such as configuration of a plurality of channel state information reference signals (CSI-RSs), configuration of a plurality of channel state information-interference measurement resources (CSI-IMRs), and virtual cell identity (cell ID) based reception measurement.

However, in existing terminals, a terminal supporting TM 10 has an extremely low penetration rate. Consequently, it is difficult to effectively eliminate inter-cell interference by using a coordination technology in TM 10 in an existing protocol.

SUMMARY

This application provides a channel state information measurement method and apparatus and a network side device, to obtain, when a terminal supports configuration of only one CSI-RS, channel state information (CSI) of different nodes used for coordinated multipoint transmission.

According to a first aspect, a channel state information measurement method is provided. The measurement method includes: A network side device configures channel state information reference signal CSI-RS transmit information of M access points, where the CSI-RS transmit information is used to indicate the M access points to periodically send a CSI-RS to a first user equipment at a preset interval, the preset interval is a time interval and/or a subband interval, and M is an integer greater than 1. The network side device obtains channel state information CSI corresponding to each of the M access points, where the CSI corresponding to the access point includes first CSI, and the first CSI is information that is measured based on the CSI-RS corresponding to the access point and fed back by the first user equipment. When the preset interval is the subband interval, a PMI in the CSI corresponding to the access point is fed back at a granularity of a subband.

In a possible implementation, when the preset interval is the subband interval, that the M access points periodically send the CSI-RS to the first user equipment at the preset interval includes: The M access points send the CSI-RS in polling mode in any system bandwidth at the subband interval.

In this implementation, the access points may fully use a coordination bandwidth to send the CSI-RS.

In a possible implementation, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

In this implementation, the access points may jointly send the CSI-RS.

In a possible implementation, when the preset interval is the subband interval, that the M access points or K joint access point groups periodically send the CSI-RS to the first user equipment at the preset interval includes: The M access points or the K joint access point groups send the CSI-RS in polling mode in any system bandwidth at the subband interval.

In this implementation, the access points or the joint access point groups may fully use a coordination bandwidth to send the CSI-RS.

In a possible implementation, that the M access points or K joint access point groups periodically send the CSI-RS to the first user equipment at the preset interval includes: determining a reference antenna of each access point in a first joint access point group; and mapping each port in a first CSI-RS to the reference antenna of the access point in the first joint access point group, where the reference antenna of the access point in the first joint access point group is mapped to at least one port.

In this implementation, a reference antenna of each access point in a joint access point group is mapped to a port of the CSI-RS jointly sent by the joint access point group, so that phase calibration information between the access points can be obtained.

In a possible implementation, that the network side device obtains channel state information CSI corresponding to each of the M access points includes: The network side device obtains first joint CSI, where the first joint CSI is information that is measured based on a first joint CSI-RS and fed back by the first user equipment, and the first joint CSI-RS is a CSI-RS jointly sent by access points in a first joint access point group in the K joint access point groups. The measurement method includes: determining, based on rank indicators RIs and precoding matrix indicators PMIs in CSI corresponding to access points in a working set corresponding to the first user equipment and a PMI in CSI corresponding to the first joint access point group, a joint weight of coherent joint transmission corresponding to the working set, where the first joint access point group includes the access points in the working set.

In this implementation, a joint weight of coherent joint transmission of coordinated access points may be obtained, thereby avoiding mismatch between a codebook and an antenna form.

In a possible implementation, a joint weight of coherent joint transmission corresponding to a measurement set is represented as:

$$W = \sum_{i \in C} W'\left(\sum_{j=1}^{i-1} N_j + a\right) Q_i \tilde{W}_i$$

where C is the working set corresponding to the first user equipment, and a number of an element in the working set corresponds to a number of an access point in the working set in the measurement set; the measurement set is a set including the M access points; $N_j$ represents a quantity of physical antennas of a $j^{th}$ access point in the measurement set;

$$W'\left(\sum_{j=1}^{i-1} N_j + a\right)$$

represents a compensation phase corresponding to a reference antenna of an $i^{th}$ access point in the working set; $Q_i$ is a mapping matrix of a CSI-RS port to a physical antenna of the $i^{th}$ access point in the working set; $\tilde{W}_i$ represents a weight obtained after phase normalization is performed on a precoding weight $W_i$ corresponding to a PMI that is fed back by the first user equipment based on the CSI-RS sent by the $i^{th}$ access point in the working set, where the phase normalization is performed based on the reference antenna on each rank indicated by an RI;

$$\tilde{W}_i(:,k) = W_i(:,k) \frac{|W_i(a,k)|}{W_i(a,k)},$$

where $W_i(:, k)$ represents a $k^{th}$ column of a matrix corresponding to the precoding weight $W_i$, and $W_i(a, k)$ represents an $a^{th}$ element in the $k^{th}$ column of the matrix corresponding to the weight $W_i$, where a corresponds to the reference antenna of the $i^{th}$ access point in the working set, and the reference antenna is a physical antenna to which the CSI-RS port is mapped when the access points in the first joint access point group jointly send the CSI-RS; W' represents a weight obtained after amplitude normalization is performed on each element of a precoding weight $W_{Cali}$ between the access points in the first joint access point group, and $W_{Cali} = Q_{M+1} W_{M+1}(:, 1)$, where $Q_{M+1}$ is a mapping matrix of reference antennas of the access points in the first joint access point group when the access points in the first joint access point group jointly send the CSI-RS, and $W_{M+1}(:, 1)$ is the $1^{st}$ column of a precoding weight $W_{M+1}$ of a PMI that is fed back by the first user equipment based on the CSI-RS sent by the first joint access point group; and a joint weight corresponding to the access points in the working set is a row corresponding to physical antennas of the access points in the working set in W.

In this implementation, a joint weight of coherent joint transmission of coordinated access points may be obtained, thereby avoiding mismatch between a codebook and an antenna form.

In a possible implementation, the measurement method includes: determining, based on rank indicators RIs and precoding matrix indicators PMIs in CSI corresponding to access points in a working set corresponding to the first user equipment, a joint weight of non-coherent joint transmission corresponding to the working set, where the M access points include the access points in the working set.

In this implementation, a joint weight of non-coherent joint transmission of coordinated access points may be obtained, thereby avoiding mismatch between a codebook and an antenna form.

In a possible implementation, a joint weight of non-coherent joint transmission corresponding to a measurement set is represented as:

$$W = \sum_{i \in C} Q_i W_i$$

where C is the working set corresponding to the first user equipment, and a number of an element in the working set corresponds to a number of an access point in the working set in the measurement set; the measurement set is a set including the M access points; $Q_i$ is a mapping matrix of a CSI-RS port to an antenna of an $i^{th}$ access point in the working set; $W_i$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In this implementation, a joint weight of non-coherent joint transmission of coordinated access points may be obtained, thereby avoiding mismatch between a codebook and an antenna form.

In a possible implementation, a joint weight of non-coherent joint transmission corresponding to a measurement set is represented as:

$$W = [Q_{C_1} W_{C_1} L \; Q_{C_g} W_{C_g}]$$

where C is the working set corresponding to the first user equipment, and a number of an element in the working set corresponds to a number of an access point in the working set in the measurement set; the measurement set is a set including the M access points; $C_i$ represents a number of an $i^{th}$ access point in the working set in the measurement set; g represents a quantity of access points in the working set; $Q_{Ci}$ is a mapping matrix of a CSI-RS port to an antenna of the $i^{th}$ access point in the working set; $W_{Ci}$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In this implementation, a joint weight of non-coherent joint transmission of coordinated access points may be obtained, thereby avoiding mismatch between a codebook and an antenna form.

In a possible implementation, the CSI-RS transmit information is used to indicate M1 access points to periodically send a CSI-RS to each second user equipment in a second user equipment set at a preset interval. CSI corresponding to each access point includes a second CSI set, and the second CSI set includes information that is measured based on the CSI-RS corresponding to the access point and fed back by the second user equipment. The M access points include a working set of the first user equipment, and the M1 access points include a working set of the second user equipment. The working set of the first user equipment includes at least one access point, and the working set of the second user equipment includes at least one access point. The M access points overlap or are the same as the M1 access points.

The measurement method further includes: determining, based on a PMI in CSI between the working set of the second user equipment in the second user equipment set and the first user equipment, a first weight and a first SINR linear value between the access point in the working set of the second user equipment and the first user equipment; and determining, based on a PMI in CSI between the working set of the first user equipment and the second user equipment, a second weight and a second SINR linear value between the access point in the working set of the first user equipment and the second user equipment, where a measurement set of the first user equipment overlaps the working set of the second user equipment in the second user equipment set; when the working set of the second user equipment schedules a corresponding second user equipment, determining, based on a PMI in CSI between the working set of the second user equipment and the corresponding second user equipment, a third weight between the access point in the working set of the second user equipment and the corresponding second user equipment; and when the working set of the first user equipment schedules the first user equipment, determining, based on a PMI in CSI between the working set of the first user equipment and the first user equipment, a fourth weight between the access point in the working set of the first user equipment and the first user equipment; determining, based on the first weight, the third weight of the second user equipment, and the first SINR linear value, first interference information of the working set of the second user equipment to the first user equipment when the working set of the second user equipment schedules the corresponding second user equipment; and determining, based on the second weight of the second user equipment, the fourth weight, and the second SINR linear value of the second user equipment, information about second interference of the working set of the first user equipment to the second user equipment when the working set of the first user equipment schedules the first user equipment; determining a sum of metric values of the first user equipment and the second user equipment based on the first interference information and the second interference information; determining a coordinated second user equipment based on the sum of the metric values of the first user equipment and the second user equipment; and determining a coordination mode between the first user equipment and the coordinated second user equipment based on a sum of metric values of the coordinated second user equipment and the first user equipment.

In this implementation, the network side device may estimate, based on a scheduling result of each coordinated access point and usage of a PMI, a magnitude of interference between the coordinated access points, and then determines a coordination mode and an accurate modulation and coding scheme value of each scheduled user, to obtain a more accurate joint adaptive modulation and coding effect.

In a possible implementation, the determining a coordination mode between the first user equipment and the coordinated second user equipment based on a sum of metric values of the coordinated second user equipment and the first user equipment includes:

The network side device performs reuse transmission on the first user equipment and the coordinated second user equipment when the sum of the metric values of the coordinated second user equipment and the first user equipment is greater than a metric value obtained during independent scheduling of the first user equipment, where the independent scheduling of the first user equipment means that the working set of the second user equipment does not schedule the corresponding second user equipment when the working set of the first user equipment schedules the first user equipment.

In a possible implementation, the determining a coordination mode between the first user equipment and the coordinated second user equipment based on a sum of metric values of the coordinated second user equipment and the first user equipment includes: determining that the coordination mode is dynamic point blanking DPB coordination when the sum of the metric values of the coordinated second user equipment and the first user equipment is less than a metric value obtained during independent scheduling of the first user equipment.

In a possible implementation, the CSI-RS transmit information includes CSI-RS configuration information, and the CSI-RS configuration information includes at least CSI-RS pilot sequence generation parameter information, CSI-RS port quantity information, resource mapping location information, subframe location offset information, and a user equipment side CSI-RS receive period.

When the preset interval is the time interval, duration of the time interval is equal to duration of the user equipment side CSI-RS receive period, and for any one of the M access points, duration of a CSI-RS transmit period is at least M times the duration of the user equipment side CSI-RS receive period; or when the preset interval is the subband interval, for any one of the M access points, duration of a CSI-RS transmit period is equal to duration of the user equipment side CSI-RS receive period.

The measurement method further includes: The network side device sends the CSI-RS configuration information to the first user equipment, to enable the first user equipment to measure the CSI based on the CSI-RS configuration information and the CSI-RS that corresponds to the access point and feed back the CSI.

In this implementation, the network side device sends the CSI-RS configuration information to the user equipment, to enable the user equipment to measure the CSI based on the CSI-RS configuration information and the corresponding CSI-RS and feed back the CSI.

In a possible implementation, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

When the preset interval is the time interval, for any one of the M access points or any one of the K joint access point groups, the duration of the CSI-RS transmit period is M+K times the duration of the user equipment side CSI-RS receive period; or when the preset interval is the subband interval, for any one of the M access points or any one of the K joint access point groups, the duration of the CSI-RS transmit period is equal to the duration of the user equipment side CSI-RS receive period.

In this implementation, the network side device sends the CSI-RS configuration information to the user equipment, to enable the user equipment to measure the CSI based on the CSI-RS configuration information and the corresponding CSI-RS and feed back the CSI.

In a possible implementation, before the network side device configures the channel state information reference signal CSI-RS transmit information of the M access points, the measurement method further includes: determining, by the network side device, the M access points based on a reference signal received power RSRP fed back by the first user equipment; or measuring, by the network side device, the RSRP based on a sounding reference signal SRS sent by the first user equipment; and determining the M access points based on the measured RSRP.

In this implementation, access point included in a CSI measurement set corresponding to the user equipment may be determined based on the SRS and the RSRP corresponding to the user equipment.

According to a second aspect, a channel state information measurement apparatus is provided. The measurement apparatus includes: a configuration unit, configured to configure channel state information reference signal CSI-RS transmit information of M access points, where the CSI-RS transmit information is used to indicate the M access points to periodically send a CSI-RS to a first user equipment at a preset interval, the preset interval is a time interval and/or a subband interval, and M is an integer greater than 1; and an obtaining unit, configured to obtain channel state information CSI corresponding to each of the M access points, where the CSI corresponding to the access point includes first CSI, and the first CSI is information that is measured based on the CSI-RS corresponding to the access point and fed back by the first user equipment, where when the preset interval is the subband interval, a PMI in the CSI corresponding to the access point is fed back at a granularity of a subband.

In a possible implementation, when the preset interval is the subband interval, that the M access points periodically send the CSI-RS to the first user equipment at the preset interval includes: The M access points send the CSI-RS in polling mode in any system bandwidth at the subband interval.

In a possible implementation, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

In a possible implementation, when the preset interval is the subband interval, that the M access points or K joint access point groups periodically send the CSI-RS to the first user equipment at the preset interval includes: The M access points or the K joint access point groups send the CSI-RS in polling mode in any system bandwidth at the subband interval.

In a possible implementation, that the M access points or K joint access point groups periodically send the CSI-RS to the first user equipment at the preset interval includes: determining a reference antenna of each access point in a first joint access point group; and mapping each port in a first CSI-RS to the reference antenna of the access point in the first joint access point group, where the reference antenna of the access point in the first joint access point group is mapped to at least one port.

In a possible implementation, the obtaining unit is configured to obtain first joint CSI, where the first joint CSI is information that is measured based on a first joint CSI-RS and fed back by the first user equipment, and the first joint CSI-RS is a CSI-RS jointly sent by access points in a first joint access point group in the K joint access point groups. The measurement apparatus further includes a first determining unit, configured to determine, based on rank indicators RIs and precoding matrix indicators PMIs in CSI corresponding to access points in a working set corresponding to the first user equipment and a PMI in CSI corresponding to the first joint access point group, a joint weight of coherent joint transmission corresponding to the working set, where the first joint access point group includes the access points in the working set.

In a possible implementation, a joint weight of coherent joint transmission corresponding to a measurement set is represented as:

$$W = \sum_{i \in C} W'\left(\sum_{j=1}^{i-1} N_j + a\right) Q_i \tilde{W}_i^\%$$

where C is the working set corresponding to the first user equipment, and a number of an element in the working set corresponds to a number of an access point in the working set in the measurement set; the measurement set is a set including the M access points; $N_j$ represents a quantity of physical antennas of a $j^{th}$ access point in the measurement set;

$$W'\left(\sum_{j=1}^{i-1} N_j + a\right)$$

represents a compensation phase corresponding to a reference antenna of an $i^{th}$ access point in the working set; $Q_i$ is a mapping matrix of a CSI-RS port to a physical antenna of the $i^{th}$ access point in the working set; $\tilde{W}_i^\%$ represents a weight obtained after phase normalization is performed on a precoding weight $W_i$ corresponding to a PMI that is fed back by the first user equipment based on the CSI-RS sent by the $i^{th}$ access point in the working set, where the phase normalization is performed based on the reference antenna on each rank indicated by an RI;

$$\tilde{W}_i^\%(:,k) = W_i(:,k) \frac{|W_i(a,k)|}{W_i(a,k)},$$

where $W_i(:, k)$ represents a $k^{th}$ column of a matrix corresponding to the precoding weight $W_i$, and $W_i(a, k)$ represents an $a^{th}$ element in the $k^{th}$ column of the matrix corresponding to the weight $W_i$, where a corresponds to the reference antenna of the $i^{th}$ access point in the working set, and the reference antenna is a physical antenna to which the CSI-RS port is mapped when the access points in the first joint access point group jointly send the CSI-RS; W' represents a weight obtained after amplitude normalization is performed on each element of a precoding weight $W_{Cali}$ between the access points in the first joint access point group, and $W_{Cali}=Q_{M+1}W_{M+1}(:,1)$, where $Q_{M+1}$ is a mapping matrix of reference antennas of the access points in the first joint access point group when the access points in the first joint access point group jointly send the CSI-RS, and $W_{M+1}(:, 1)$ is the $1^{st}$ column of a precoding weight $W_{M+1}$ of a PMI that is fed back by the first user equipment based on the CSI-RS sent by the first joint access point group; and a joint weight corresponding to the access points in the working set is a row corresponding to physical antennas of the access points in the working set in W.

In a possible implementation, the measurement apparatus includes a second determining unit, configured to determine, based on rank indicators RIs and precoding matrix indicators PMIs in CSI corresponding to access points in a working set corresponding to the first user equipment, a joint weight of non-coherent joint transmission corresponding to the working set, where the M access points include the access points in the working set.

In a possible implementation, a joint weight of non-coherent joint transmission corresponding to a measurement set is represented as:

$$W = \sum_{i \in C} Q_i W_i$$

where C is the working set corresponding to the first user equipment, and a number of an element in the working set corresponds to a number of an access point in the working set in the measurement set; the measurement set is a set including the M access points; $Q_i$ is a mapping matrix of a CSI-RS port to an antenna of an $i^{th}$ access point in the working set; $W_i$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In a possible implementation, a joint weight of non-coherent joint transmission corresponding to a measurement set is represented as:

$$W=[Q_{C_1}W_{C_1}L\ Q_{C_g}W_{C_g}]$$

where C is the working set corresponding to the first user equipment, and a number of an element in the working set corresponds to a number of an access point in the working set in the measurement set; the measurement set is a set including the M access points; $C_i$ represents a number of an $i^{th}$ access point in the working set in the measurement set; g represents a quantity of access points in the working set; $Q_{C_i}$ is a mapping matrix of a CSI-RS port to an antenna of the $i^{th}$ access point in the working set; $W_{C_i}$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In a possible implementation, the CSI-RS transmit information is used to indicate M1 access points to periodically send a CSI-RS to each second user equipment in a second user equipment set at a preset interval. CSI corresponding to each access point includes a second CSI set, and the second CSI set includes information that is measured based on the CSI-RS corresponding to the access point and fed back by the second user equipment. The M access points include a working set of the first user equipment, and the M1 access points include a working set of the second user equipment. The working set of the first user equipment includes at least one access point, and the working set of the second user equipment includes at least one access point. The M access points overlap or are the same as the M1 access points.

The measurement apparatus includes a third determining unit, configured to: determine, based on a PMI in CSI between the working set of the second user equipment in the second user equipment set and the first user equipment, a first weight and a first SINR linear value between the access point in the working set of the second user equipment and the first user equipment; and determine, based on a PMI in CSI between the working set of the first user equipment and the second user equipment, a second weight and a second SINR linear value between the access point in the working set of the first user equipment and the second user equipment, where a measurement set of the first user equipment overlaps the working set of the second user equipment in the second user equipment set.

The third determining unit is further configured to: when the working set of the second user equipment schedules a corresponding second user equipment, determine, based on a PMI in CSI between the working set of the second user equipment and the corresponding second user equipment, a third weight between the access point in the working set of the second user equipment and the corresponding second user equipment; and when the working set of the first user equipment schedules the first user equipment, determine, based on a PMI in CSI between the working set of the first user equipment and the first user equipment, a fourth weight between the access point in the working set of the first user equipment and the first user equipment.

The third determining unit is further configured to: determine, based on the first weight, the third weight of the second user equipment, and the first SINR linear value, first interference information of the working set of the second user equipment to the first user equipment when the working set of the second user equipment schedules the corresponding second user equipment; and determine, based on the second weight of the second user equipment, the fourth weight, and the second SINR linear value of the second user equipment, information about second interference of the working set of the first user equipment to the second user equipment when the working set of the first user equipment schedules the first user equipment.

The third determining unit is further configured to determine a sum of metric values of the first user equipment and the second user equipment based on the first interference information and the second interference information.

The third determining unit is further configured to determine a coordinated second user equipment based on the sum of the metric values of the first user equipment and the second user equipment.

The third determining unit is further configured to determine a coordination mode between the first user equipment and the coordinated second user equipment based on a sum of metric values of the coordinated second user equipment and the first user equipment.

In a possible implementation, the measurement apparatus further includes a scheduling unit, configured to perform reuse transmission on the first user equipment and the coordinated second user equipment when the sum of the metric values of the coordinated second user equipment and the first user equipment is greater than a metric value obtained during independent scheduling of the first user equipment, where the independent scheduling of the first user equipment means that the working set of the second user equipment does not schedule the corresponding second user equipment when the working set of the first user equipment schedules the first user equipment.

In a possible implementation, the measurement apparatus further includes a scheduling unit, configured to determine that the coordination mode is dynamic point blanking DPB coordination when the sum of the metric values of the coordinated second user equipment and the first user equipment is less than a metric value obtained during independent scheduling of the first user equipment.

In a possible implementation, the CSI-RS transmit information includes CSI-RS configuration information, and the CSI-RS configuration information includes at least CSI-RS pilot sequence generation parameter information, CSI-RS port quantity information, resource mapping location information, subframe location offset information, and a user equipment side CSI-RS receive period.

When the preset interval is the time interval, duration of the time interval is equal to duration of the user equipment side CSI-RS receive period, and for any one of the M access points, duration of a CSI-RS transmit period is at least M times the duration of the user equipment side CSI-RS receive period; or when the preset interval is the subband interval, for any one of the M access points, duration of a CSI-RS transmit period is equal to duration of the user equipment side CSI-RS receive period.

The measurement apparatus further includes a sending unit, configured to send the CSI-RS configuration information to the first user equipment, to enable the first user equipment to measure the CSI based on the CSI-RS configuration information and the CSI-RS that corresponds to the access point and feed back the CSI.

In a possible implementation, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

When the preset interval is the time interval, for any one of the M access points or any one of the K joint access point groups, the duration of the CSI-RS transmit period is M+K times the duration of the user equipment side CSI-RS receive period; or when the preset interval is the subband interval, for any one of the M access points or any one of the K joint access point groups, the duration of the CSI-RS transmit period is equal to the duration of the user equipment side CSI-RS receive period.

In a possible implementation, the measurement apparatus further includes a fourth determining unit, where the fourth determining unit is configured to determine the M access points based on a reference signal received power RSRP fed back by the first user equipment; or the measurement apparatus further includes a measurement unit and a fifth determining unit, where the measurement unit is configured to measure the RSRP based on a sounding reference signal SRS sent by the first user equipment; and the fifth determining unit is configured to determine the M access points based on the measured RSRP.

According to a third aspect, a network side device is provided. The device includes a processor and a memory. The memory stores code. The processor executes the code, to perform the measurement method according to the first aspect.

According to a fourth aspect, a computer-readable storage medium storing a program is provided. The program includes instructions, and when the instructions are executed by a computer, the computer is enabled to perform the measurement method according to the first aspect.

According to the channel state information measurement method and apparatus and the network side device provided in the embodiments of this application, when the user equipment supports configuration of only one CSI-RS, the CSI-RS may be sent in a time division/frequency division manner, to obtain relatively independent CSI of different coordinated access points. On one hand, a codebook mismatch problem in multi-coordinated joint CSI-RS joint transmission can be avoided. On the other hand, a network side can be assisted in coordination and management of inter-cell interference.

DESCRIPTION OF EMBODIMENTS

The following describes technical solutions of embodiments in this application with reference to accompanying drawings. Clearly, the described embodiments are merely some but not all of the embodiments of this application.

Inter-cell interference may be eliminated by using an inter-cell interference coordination (ICIC) technology. A basic idea of the technology is managing radio resources to control the inter-cell interference. The technology is a multi-cell radio resource management solution that considers resource usage, load, and the like in a plurality of cells. There are two main ICIC manners.

Figure 1:
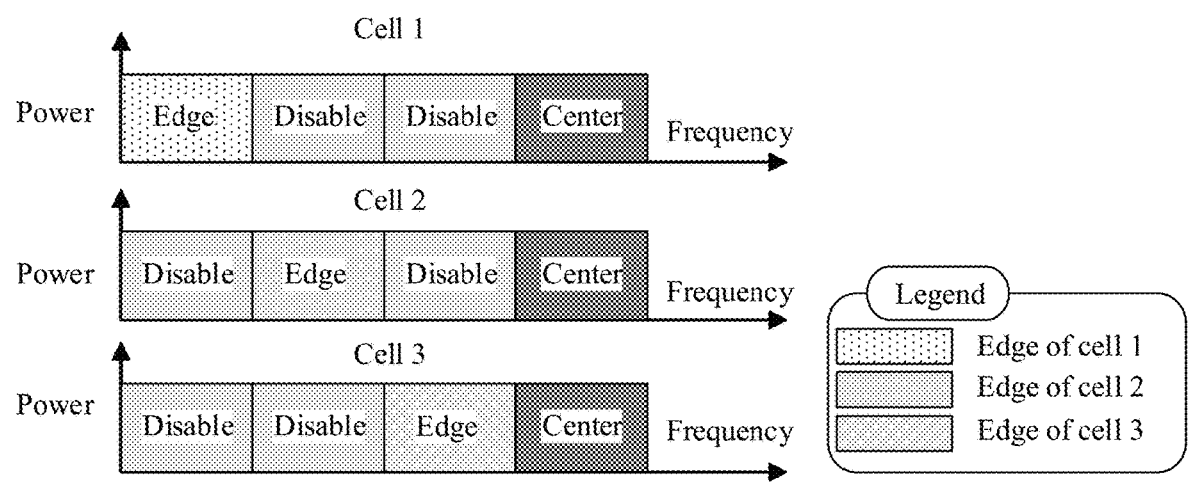
FIG. 1 is a schematic diagram of an operating principle of fractional frequency reuse according to an embodiment of this application.

The first manner is fractional frequency reuse (FFR). Refer to FIG. 1. In this manner, frequency resources are divided into two reuse sets. One is a frequency set that has a frequency reuse factor of 1 and is used for center user scheduling, and the other is a frequency set that has a frequency reuse factor greater than 1 and is used for edge user scheduling. The FFR is a static multi-cell resource management technology, and cannot adapt to a dynamic service change in each cell. Therefore, resource allocation cannot be dynamically adjusted based on service load of the cell. In addition, in a dense networking scenario, irregular cell coverage results in difficulties in effective static resource allocation.

Figure 2:
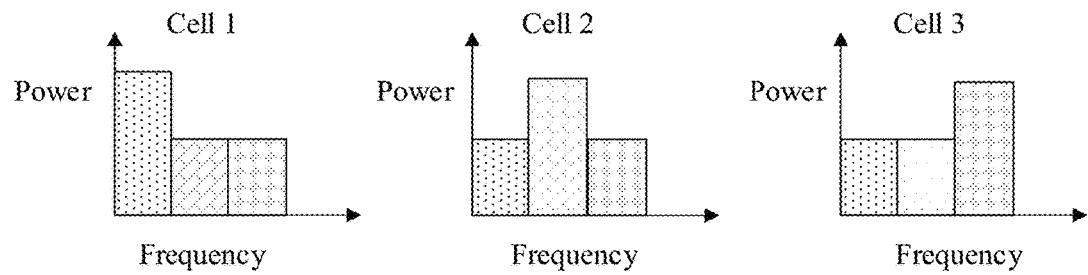
FIG. 2 is a schematic diagram of an operating principle of soft frequency reuse according to an embodiment of this application.

The second manner is soft frequency reuse (SFR). Refer to FIG. 2. In the SFR technology, an available frequency band is divided into three parts. For each cell, one part is a high-power frequency band, and other parts are low-power frequency bands. High-power frequency bands of adjacent cells do not overlap and may be used for all users, and the low-power frequency bands are used only for a low-power user in a cell center. To reduce interference to edge users of the adjacent cells, low-power transmission is required if a center user uses edge frequency bands of the adjacent cells. Compared with the FFR, the SFR specifies power usage by using a power template, so that a higher bandwidth and higher spectral efficiency can be obtained. However, the SFR still cannot eliminate the interference from a control channel. In particular, the SFR technology still belongs to a radio resource management technology. Consequently, an advantage of TM 9 over LTE R8 TM 3/4 cannot be found.

In an enhanced inter-cell interference coordination (eICIC) technology in LTE R10, intra-frequency multi-cell interference coordination is enhanced in time domain, to resolve a problem of interference in a macro-micro scenario. A macro cell configures one or more subframes as "almost blanking subframes (ABSs)", and a micro cell provides a service for a cell edge terminal in the ABS, to avoid major interference from the macro cell and improve a service rate of a cell edge user. In addition, with the use of a "cell range expansion (CRE)" technology, in the eICIC technology, more services of a macro site are offloaded (offload) to a micro site, to obtain greater cell split gains. The eICIC configures the ABS mainly to resolve a problem of interference of the macro site to the micro site. In a main gain scenario, a macro site covers a plurality of micro sites. In addition, the interference cannot be completely eliminated due to cell common signal and channel transmission in the.

In a further enhanced inter-cell interference coordination (FeICIC) technology in LTE R11, interference from a cell-specific reference signal (CRS) and another common channel is reduced through reduced power almost blanking subframe (RP-ABS) subframe configuration. Different from the ABS in which a traffic channel is completely set to empty in the ICIC, in an RP-ABS, a macro site is allowed to send a traffic channel to a center user at low power. In addition, to reduce CRS interference, in the FeICIC, a "network-assisted interference cancellation and suppression (NAICS)" manner is used to assist a terminal in cell-specific reference signal interference coordination (CRS IC). Information exchange between a macro site and a micro site is required in the FeICIC. This imposes a relatively high requirement on a delay of an X2 interface. In addition, the advantage of TM 9 over R8 TM 3/4 cannot be found either in this solution.

In a CoMP technology, based on different degrees of sharing of channel state information and data information by coordinated base stations, original interference from an adjacent cell is converted into useful information through inter-cell coordination, dynamic resource coordination and user selection are implemented through scheduling, inter-cell silence is dynamically performed, or a transmission node is dynamically selected. A network side configures a plurality of channel measurement resources and interference measurement resources for the terminal, to separately measure CSI of different coordinated nodes. The network side selects an appropriate coordination technology based on the CSI of different nodes and load information of the coordinated nodes. The CoMP technology requires configuration of a plurality of non zero power-channel state information reference signal (NZP CSI-RS) resources and configuration of a plurality of interference measurement resources. The application of the CoMP technology depends on transmission mode TM 10. However, due to a current penetration rate of a terminal in TM 10, it is difficult to show an advantage of the CoMP technology.

In a joint CSI-RS joint transmission (joint CSI-RS JT) technology, it is assumed that a quantity of coordinated transmission access points (APs) is M, and quantities of transmit antennas of the M access points are respectively $N_1$, $N_2, \ldots,$ and $N_M$. The network side configures a CSI-RS pilot pattern corresponding to $N=\Sigma_{i=1}^{M} N_i$ ports for a coordinated user equipment (UE). In this case, CSI measured by the UE directly reflects, at a time, CSI during joint transmission performed by the M access points. In the joint CSI-RS JT transmission technology, physical antennas of a plurality of access points that are separated at physical locations are combined into the CSI-RS pilot pattern corresponding to the $N=\Sigma_{i=1}^{M} N_i$ ports. Therefore, a joint CSI-RS based configuration technology requires that a protocol supports a CSI-RS pattern that matches a value of a total quantity $N=\Sigma_{i=1}^{M} N_i$ of antennas, and there is a scenario that cannot be effectively supported by an existing protocol. In addition, weights in the existing protocol are designed based on co-location base stations, and there is a problem of mismatch between a codebook and an antenna form. In addition, this manner cannot adapt to adaptive selection of different coordination manners, and when a joint transmit request fails, it is difficult to obtain a weight after a coordination set is rolled back to a single cell.

According to a channel state information measurement method provided in the embodiments of this application, when a user equipment supports configuration of only one CSI-RS, channel state information of different nodes used for coordinated multipoint transmission can be obtained, the problem of mismatch between a codebook and an antenna form can be resolved, and coordinated multipoint transmission can be implemented.

Figure 3:
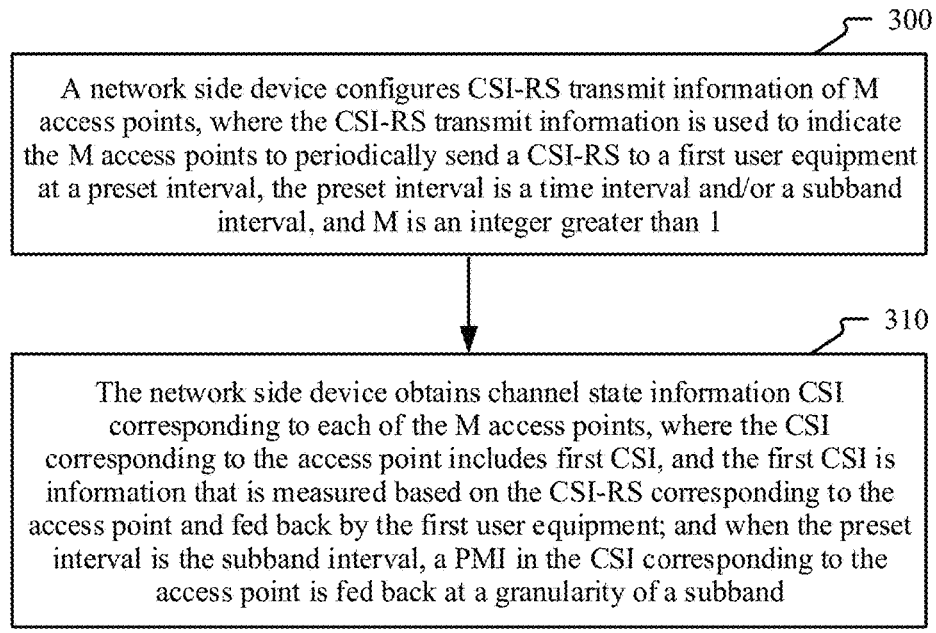
FIG. 3 is a flowchart of a channel state information measurement method according to an embodiment of this application.

The channel state information measurement method provided in the embodiments of this application is described with reference to FIG. 3. As shown in FIG. 3, the measurement method includes the following steps. Step 300: A network side device configures channel state information reference signal CSI-RS transmit information of M access points, where the CSI-RS transmit information is used to indicate the M access points to periodically send a CSI-RS to a first user equipment at a preset interval, the preset interval is a time interval and/or a subband interval, and M is an integer greater than 1. Step 310: The network side device obtains channel state information CSI corresponding to each of the M access points, where the CSI corresponding to the access point includes first CSI, and the first CSI is information that is measured based on the CSI-RS corresponding to the access point and fed back by the first user equipment. When the preset interval is the subband interval, a PMI in the CSI corresponding to the access point is fed back at a granularity of a subband.

The following describes each step in detail.

In step 300, the network side device configures the channel state information reference signal CSI-RS transmit information of the M access points, where the CSI-RS transmit information is used to indicate the M access points to periodically send the CSI-RS to the first user equipment at the preset interval, the preset interval is the time interval and/or the subband interval, and M is an integer greater than 1.

The network side device may be a base station. In an example, the network side device may be specifically a building baseband unit (BBU) of the base station. The M access points are M coordinated transmission access points. The first user equipment may be referred to as a coordinated user equipment, and is configured to measure downlink CSI of the M coordinated transmission access points. An access point that is in the M access points and that is to send common signaling such as a physical broadcast channel (PBCH) to the coordinated user equipment is referred to as a primary access point, and other access points that participate in coordinated transmission are referred to as coordinated access points.

The access point may be a remote radio unit (RRU), a remote radio head (RRH), or an antenna unit (AU). The first user equipment may be a mobile phone, a tablet computer, a computer having a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home (smart home), or the like. An application scenario is not limited in this embodiment of this application.

In an embodiment, the CSI-RS transmit information includes CSI-RS configuration information, and the CSI-RS configuration information includes at least CSI-RS pilot sequence generation parameter information, CSI-RS port quantity information, resource mapping location information, subframe location offset information, and a user equipment side CSI-RS receive period.

Pilot sequence generation parameter information, CSI-RS port quantity information, resource mapping location information, and subframe location offset information of each of the M access points are all the same as those of the primary access point.

In this embodiment, the CSI-RS configuration information may include a non-zero-power CSI-RS pattern and a CSI-RS sequence corresponding to the access point. The non-zero-power CSI-RS pattern corresponding to the access point is generated based on a quantity of CSI-RS ports of the primary access point in the M access points. The CSI-RS sequence corresponding to the access point is generated based on a cell identity of the primary access point. The primary access point is a primary access point corresponding to the first user equipment. For example, M is 3. It is assumed that three access points are RRU #0, RRU #1, and RRU #2, and RRU #0 is the primary access point. The network side device determines non-zero-power CSI-RS patterns of the access points, namely, RRU #0, RRU #1, and RRU #2, based on a quantity of CSI-RS ports of RRU #0. The network side device generates, based on a cell identity (cell ID) of RRU #0, a CSI-RS sequence corresponding to each coordinated access point.

The user equipment side CSI-RS receive period is a CSI-RS transmit period configured by a network device for a user equipment. The access points are not distinguished on a device side. Therefore, when the preset interval is a time interval T, duration of the time interval T is equal to duration of the user equipment side CSI-RS receive period. In addition, when the M access points sequentially send the CSI-RS at the time interval T, for any one of the M access points, duration of a CSI-RS transmit period is M times the duration of the user equipment side CSI-RS receive period.

When the preset interval is the time interval, duration of the time interval is equal to duration of the user equipment side CSI-RS receive period, and for any one of the M access points, duration of a CSI-RS transmit period is at least M times the duration of the user equipment side CSI-RS receive period.

When the preset interval is the subband interval, for any one of the M access points, duration of a CSI-RS transmit period is equal to duration of the user equipment side CSI-RS receive period. The first user equipment may receive the CSI-RS in different subbands in a user equipment side CSI-RS receive period. For any one of the M access points, duration of a CSI-RS transmit period is equal to duration of the user equipment side CSI-RS receive period.

The network side device further sends the CSI-RS configuration information to the first user equipment, to enable the first user equipment to measure the CSI based on the CSI-RS configuration information and the CSI-RS that corresponds to the access point and feed back the CSI.

In an example of this embodiment, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

When the preset interval is the time interval, for any one of the M access points or any one of the K joint access point groups, the duration of the CSI-RS transmit period is M+K times the duration of the user equipment side CSI-RS receive period. Neither the access points nor the joint access point groups are distinguished on a user equipment side. Therefore, when the preset interval is the time interval T, the duration of the time interval T is equal to duration of the user equipment side CSI-RS receive period. In addition, when the M access points or the K joint access point groups sequentially send the CSI-RS at the time interval T, for any one of the M access points or any one of the K joint access point groups, the duration of the CSI-RS transmit period is M+K times the duration of the user equipment side CSI-RS receive period.

When the preset interval is the subband interval, for any one of the M access points or any one of the K joint access point groups, the duration of the CSI-RS transmit period is equal to the duration of the user equipment side CSI-RS receive period.

In an embodiment, the network side device may configure the CSI-RS transmit information of the M access points in a time division manner. In this embodiment, the network side device may indicate the M access points to periodically and independently send the CSI-RS at the time interval T. The CSI-RS transmit information includes the time interval T and a CSI-RS transmit period M*T of an access point. The time interval T herein is a time period, namely, a time length between a CSI-RS transmit moment to another CSI-RS transmit moment. The CSI-RS transmit moment is a moment at which any access point sends the CSI-RS. For a CSI-RS transmit period M*T of any access point, there are a total of M CSI-RS transmit moments. Each of the M access points sends the CSI-RS once at the M CSI-RS transmit moments. Based on a CSI-RS transmit period M*T of an access point and the time interval T, the M access points may sequentially send, in a CSI-RS transmit period M*T of any access point, the CSI-RS in time domain at the time interval T. When each access point sends the CSI-RS, a CSI-RS transmit period M*T of a next access point is entered. In a CSI-RS transmit period M*T of any access point, for the M access points, subframe offsets may be $\Delta$, T+$\Delta$, . . . , and (M−1)*T+$\Delta$ respectively, where 0≤$\Delta$<T.

Figure 4:
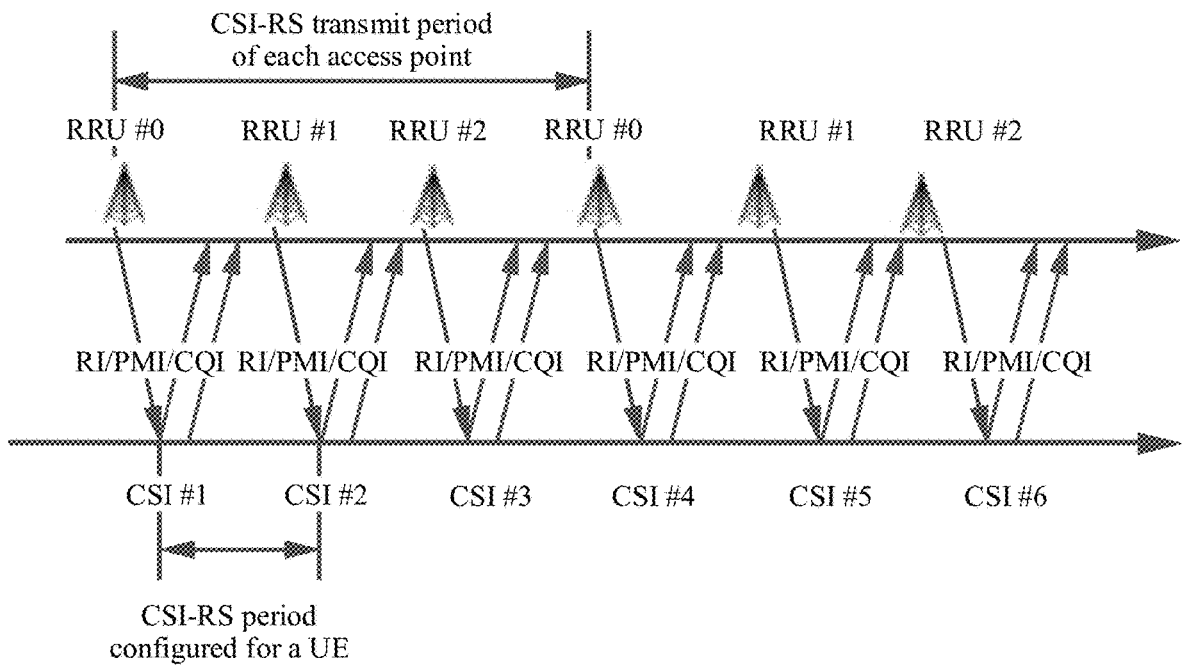
FIG. 4 is a schematic diagram of sending a CSI-RS in a time division manner according to an embodiment of this application.

For example, M is 3. It is assumed that three access points are RRU #0, RRU #1, and RRU #2. Refer to FIG. 4. RRU #0, RRU #1, and RRU #2 sequentially send, in a CSI-RS transmit period M*T of each point, the CSI-RS once at the time interval T.

In an embodiment, the network side device may configure the CSI-RS transmit information of the M access points in a frequency division manner. In this embodiment, the network side device may indicate the M access points to periodically and independently send the CSI-RS at a subband interval b. The CSI-RS transmit information includes the subband interval b and a CSI-RS transmit period T of an access point. In this embodiment, the M access points simultaneously send, at a CSI-RS transmit moment in a CSI-RS transmit period T of any access point, the CSI-RS in different subbands B of a system bandwidth. An interval between subbands used by adjacent access points for CSI-RS transmission in frequency domain is the subband interval b, where the subband interval b is an integer multiple of a bandwidth of the subband B.

In an example, when the preset interval is the subband interval, that the M access points periodically send the CSI-RS to the first user equipment at the preset interval includes: The M access points send the CSI-RS in polling mode in any system bandwidth at the subband interval.

In this example, when the system bandwidth has a relatively large quantity of subbands, the M access points may send, at a CSI-RS transmit moment, the CSI-RS in at least one iteration in the system bandwidth. In this case, any one of the M access points may send the CSI-RS in at least two iterations at M times the subband interval, and a total frequency domain width used by the access points for CSI-RS transmission is equal to the system bandwidth.

It should be noted that the system bandwidth may be insufficient to support each of the M access points in sending the CSI-RS for N times in the system bandwidth. Some access points may send the CSI-RS for N times, and other access points may send the CSI-RS for N−1 times, where N is an integer greater than 1. Therefore, in frequency domain, at different CSI-RS transmit moments, when the M access points send the CSI-RS in polling mode in different subbands of the entire system bandwidth, different access points may each be used as a start point, and each access point sends the CSI-RS in polling mode at the subband interval.

In an embodiment, the network side device may configure the CSI-RS transmit information of the M access points in a manner based on a combination of time division polling and frequency division polling. The network side device may indicate the M access points to periodically and independently send the CSI-RS at the time interval T and a subband interval b. The CSI-RS transmit information includes the time interval T, the subband interval b, and a CSI-RS transmit period M*T of an access point. In frequency domain, at any CSI-RS transmit moment in a CSI-RS transmit period M*T of any access point, the M access points send, based on the CSI-RS transmit information, the CSI-RS in different subbands B of a system bandwidth. An interval between subbands used by adjacent access points for CSI-RS transmission in frequency domain is the subband interval b, where the subband interval b is an integer multiple of a bandwidth of the subband B. In this embodiment, when there are a large quantity of subbands, any one of the M access points may send, at a same CSI-RS transmit moment, the CSI-RS in at least two iterations at M times the subband interval b, and a total frequency domain width used by the access points for CSI-RS transmission is equal to the system bandwidth.

It should be noted that the system bandwidth may be insufficient to support each of the M access points in sending the CSI-RS for N times in the system bandwidth. Some access points may send the CSI-RS for N times, and other access points may send the CSI-RS for N−1 times, where N is an integer greater than 1. In this embodiment, in frequency domain, at an adjacent CSI-RS transmit moment in a CSI-RS transmit period M*T of any access point, when the M access points send the CSI-RS in polling mode in different subbands B of the entire system bandwidth, different access points may each be used as a start point, and each access point sends the CSI-RS in polling mode at the subband interval b.

In the manner based on the combination of time division polling and frequency division polling, the time interval T is equal to the duration of the user equipment side CSI-RS receive period.

In an embodiment, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer. In this embodiment, the network side device may indicate the M access points to periodically and independently send the CSI-RS at the preset interval and to periodically and jointly send the CSI-RS at the preset interval.

In an example of this embodiment, the network side device may indicate the M access points to periodically and independently send the CSI-RS at the time interval T and to periodically and jointly send the CSI-RS at the time interval T. The CSI-RS transmit information includes the time interval T, access point joint transmit information, and a CSI-RS transmit period (M+K)*T of an access point. The access point joint transmit information may indicate that the M access points are divided into K groups, and access points in each group are configured to jointly send the CSI-RS. For a CSI-RS transmit period (M+K)*T of any access point or any joint access point group, there are a total of M+K CSI-RS transmit moments. Each of the M access points or each of the K joint access point groups sends the CSI-RS once at the M+K CSI-RS transmit moments. In a CSI-RS transmit period (M+K)*T of any access point or any joint access point group, for the M access points, subframe offsets may be $\Delta$, T+$\Delta$, ..., and (M−1)*T+$\Delta$ respectively; or for the K joint access point groups, subframe offsets may be M*T+$\Delta$, ..., and (M+K−1)*T+$\Delta$ respectively, where $0 \leq \Delta < T$.

It should be noted that, to avoid channel expiration, for values of M and K, a CSI-RS transmit period of an access point or a joint access point group and a moving speed of the user equipment need to be considered. In an example, M+K<8, and K<M.

For example, M is 3. It is assumed that three access points are RRU #0, RRU #1, and RRU #2.

Figure 5:
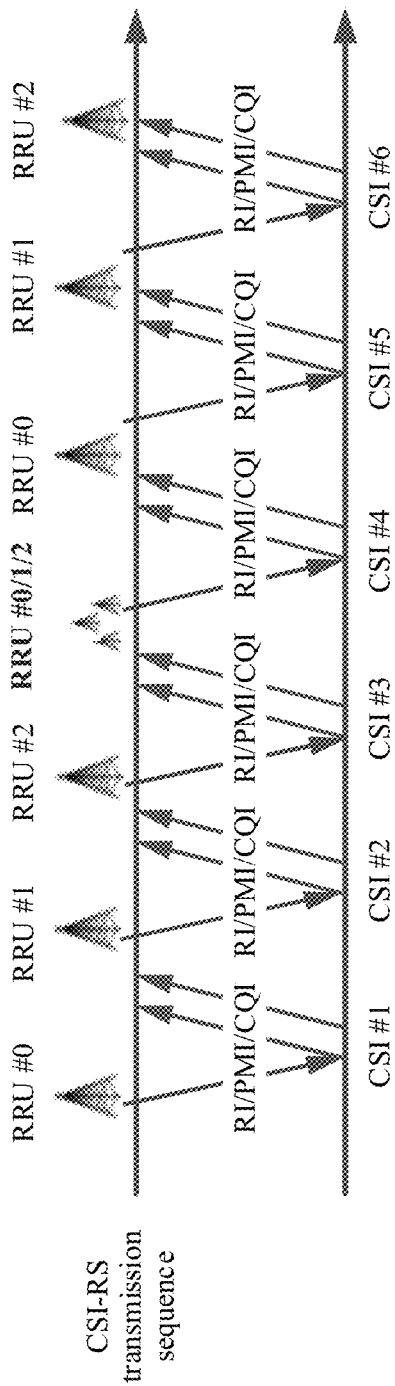
FIG. 5 is a schematic diagram of sending a CSI-RS by an access point in a time division manner according to an embodiment of this application.

In an example, it is assumed that K is 1. To be specific, RRU #0, RRU #1, and RRU #2 are grouped into a joint access point group. The joint access point group includes RRU #0, RRU #1, and RRU #2, and may be represented as RRU #0/1/2. Refer to FIG. 5. RRU #0, RRU #1, RRU #2, and RRU #0/1/2 sequentially send, in a CSI-RS transmit period (3+1)*T of each access point, the CSI-RS at the time interval T.

Figure 6:
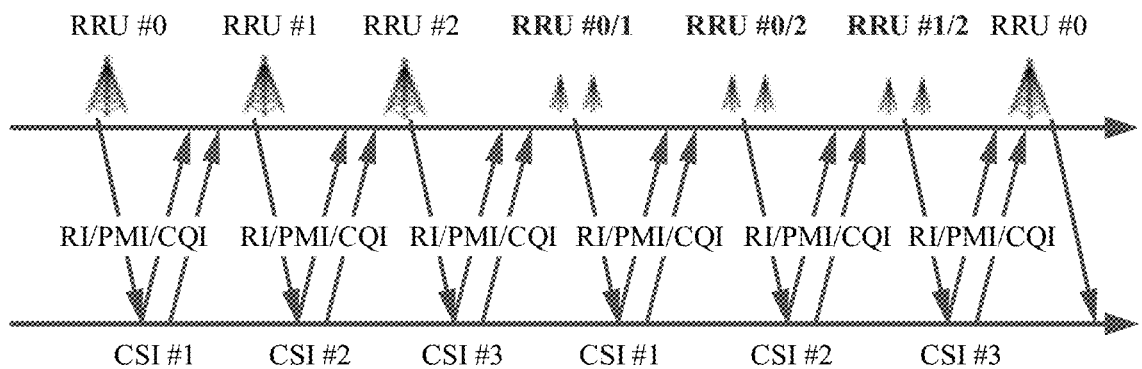
FIG. 6 is a schematic diagram of sending a CSI-RS by an access point or a joint access point group in a time division manner according to an embodiment of this application.

In an example, it is assumed that K is 3. To be specific, RRU #0, RRU #1, and RRU #2 are grouped into three joint access point groups. That is, RRU #0, RRU #1, and RRU #2 are grouped in pairs to obtain three joint access point groups, and the three joint access point groups are respectively represented as RRU #0/1, RRU #0/2, and RRU #1/2. Refer to FIG. 6. RRU #0, RRU #1, RRU #2, RRU #0/1, RRU #0/2, and RRU #1/2 sequentially send, in a CSI-RS transmit period (3+3)*T of each access point, the CSI-RS at the time interval T.

A quantity of CSI-RS ports, a CSI-RS pattern, and a CSI-RS sequence of each access point or each joint access point group are the same as those of the primary access point.

In an example of the foregoing embodiment, the network side device may indicate the M access points to periodically and independently send the CSI-RS at the subband interval b and to periodically and jointly send the CSI-RS at the subband interval b. The CSI-RS transmit information includes the subband interval b, access point joint transmit information, and a CSI-RS transmit period T of an access point. The access point joint transmit information may indicate that the M access points are divided into K groups, and access points in each group are configured to jointly send the CSI-RS. For a specific grouping manner, refer to the foregoing descriptions. Details are not described herein again. Based on a CSI-RS transmit period T of an access point and the subband interval b, the M access points or the K joint access point groups may send, in the CSI-RS transmit period T of the access point, the CSI-RS in different subbands B. An interval between subbands used by adjacent access points for CSI-RS transmission in frequency domain is the subband interval b, where the subband interval b is an integer multiple of a bandwidth of the subband B.

In an example of this embodiment, when the preset interval is the subband interval, that the M access points or K joint access point groups periodically send the CSI-RS to the first user equipment at the preset interval includes: The M access points or the K joint access point groups send the CSI-RS in polling mode in any system bandwidth at the subband interval.

In this example, when the system bandwidth has a relatively large quantity of subbands, the M access points or the K joint access point groups may send, at a CSI-RS transmit moment, the CSI-RS in at least one iteration in the system bandwidth. In this case, any one of the M access points or any one of the K joint access point groups may send the CSI-RS in at least two iterations at M+k times the subband interval, and a total frequency domain width used by the access points or the access point groups for CSI-RS transmission is equal to the system bandwidth.

It should be noted that the system bandwidth may be insufficient to support each of the M access points or each of the K joint access point groups in sending the CSI-RS for N times in the system bandwidth. Some access points or some joint access point groups may send the CSI-RS for N times, and other access points or other joint access point groups may send the CSI-RS for N−1 times, where N is an integer greater than 1. Therefore, in frequency domain, at different CSI-RS transmit moments, when the M access points or the K joint access point groups send the CSI-RS in polling mode in different subbands of the entire system bandwidth, different access points or different joint access point groups may each be used as a start point, and each access point or each joint access point group sends the CSI-RS in polling mode at the subband interval.

In an example of this embodiment, the network side device may indicate the M access points to periodically and independently send the CSI-RS at the time interval T and the subband interval b and to periodically and jointly send the CSI-RS at the time interval T and the subband interval b. The CSI-RS transmit information includes the time interval T, access point joint transmit information in time domain, a CSI-RS transmit period (M+K1)*T of an access point, the subband interval b, access point joint transmit information in frequency domain, and a frequency domain interval used by the access point for CSI-RS transmission in frequency domain. A frequency domain interval used by any access point or any joint access point group for CSI-RS transmission in frequency domain is (M+K2)*b. K1 may be the same as or different from K2. K1 is used to indicate that the M access points are divided into K1 groups in time domain, and access points in each group are configured to jointly send the CSI-RS in time domain. K2 is used to indicate that the M access points are divided into K2 groups in frequency domain, and access points in each group are configured to jointly send the CSI-RS in frequency domain.

When there are a large quantity of subbands, any one of the M access points may send, at a same CSI-RS transmit moment, the CSI-RS in at least two iterations at M+K2 times the subband interval b, and a total frequency domain width used by the access points for CSI-RS transmission is equal to the system bandwidth.

In this embodiment, in time domain, the M access points or the K1 joint access point groups each send, in a CSI-RS transmit period (M+K1)*T of any access point, the CSI-RS at different CSI-RS transmit moments. In frequency domain, at any CSI-RS transmit moment, the M access points or the K2 joint access point groups send the CSI-RS in at least one iteration in different subbands.

It should be noted that, to avoid channel expiration, for values of M and K, a CSI-RS transmit period of an access point or a joint access point group and a moving speed of the user equipment need to be considered. In an example, M+K1≤8, and K1<M.

Figure 7:
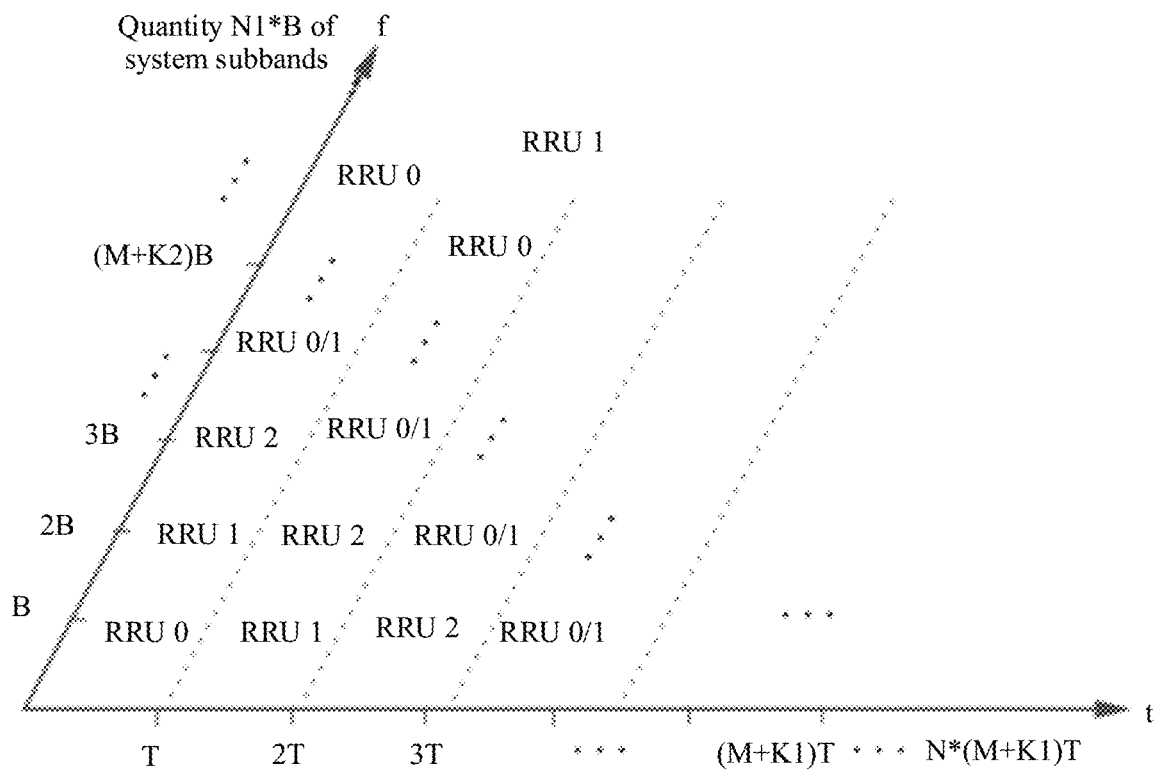
FIG. 7 is a schematic diagram of sending a CSI-RS by an access point or a joint access point group in a time division manner and in a frequency division manner according to an embodiment of this application.

For example, M is 3. It is assumed that three access points are RRU #0, RRU #1, and RRU #2. It is assumed that K1 is 3. To be specific, in time domain, there are three joint access point groups: RRU #0/1, RRU #0/2, and RRU #1/2. It is assumed that K2 is 3. To be specific, in frequency domain, there are three joint access point groups: RRU #0/1, RRU #0/2, and RRU #1/2. Refer to FIG. 7. In time domain, RRU #0, RRU #1, RRU #2, RRU #0/1, RRU #0/2, and RRU #1/2 sequentially send, in a CSI-RS transmit period (3+3)*T of any access point, the CSI-RS at the time interval T. In frequency domain, RRU #0, RRU #1, RRU #2, RRU #0/1, RRU #0/2, and RRU #1/2 sequentially send, at a CSI-RS transmit moment, the CSI-RS in different subbands B in (3+3)*B. The subband interval b is equal to a bandwidth of the subband B. When there are a large quantity of system subbands, RRU #0, RRU #1, RRU #2, RRU #0/1, RRU #0/2, and RRU #1/2 may simultaneously send the CSI-RS in polling mode. Any one of the M access points may send, at a same CSI-RS transmit moment, the CSI-RS in at least two iterations at M+K2 times the subband interval.

It should be noted that the system bandwidth may be insufficient to support each of the M access points or each of the K joint access point groups in sending the CSI-RS for N times in the system bandwidth. Some access points or some joint access point groups may send the CSI-RS for N times, and other access points or other joint access point groups may send the CSI-RS for N−1 times, where N is an integer greater than 1. Therefore, in frequency domain, at different CSI-RS transmit moments, when the M access points or the K2 joint access point groups send the CSI-RS in polling mode in different subbands of the entire system bandwidth, different access points or different joint access point groups may each be used as a start point, and each access point or each joint access point group sends the CSI-RS in polling mode at the subband interval.

In the manner based on the combination of time division polling and frequency division polling, the time interval T is equal to the duration of the user equipment side CSI-RS receive period.

In an example of the foregoing embodiment, that the M access points or K joint access point groups periodically send the CSI-RS to the first user equipment at the preset interval includes: determining a reference antenna of each access point in a first joint access point group; and mapping each port in a first CSI-RS to the reference antenna of the access point in the first joint access point group, where the reference antenna of the access point in the first joint access point group is mapped to at least one port.

In this example, when configuring the CSI-RS transmit information, the network side device further configures mapping information between a reference antenna of each of the K joint access point groups and a CSI-RS port. For the first joint access point group, mapping information between a reference antenna and a CSI-RS port is used to indicate to determine the reference antenna of the access point in the first joint access point group and a mapping relationship between each reference antenna and a CSI-RS port. A physical antenna may be selected from a plurality of physical antennas of any access point as a reference antenna. When access points in the first joint access point group jointly send the CSI-RS, a reference antenna of each access point in the first joint access point group is mapped to at least one of the CSI-RS ports. In addition, another antenna of each access point is left empty on a CSI-RS transmit resource.

For example, M is 3. It is assumed that three access points are RRU #0, RRU #1, and RRU #2.

Figure 8:
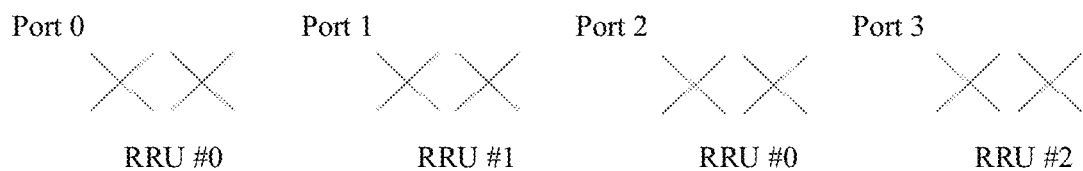
FIG. 8 is a schematic diagram of a mapping relationship between a CSI-RS port and a reference antenna of a joint access point group according to an embodiment of this application.
Figure 9:
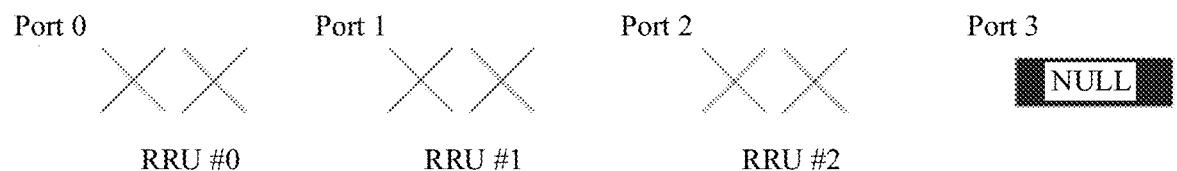
FIG. 9 is a schematic diagram of another mapping relationship between a CSI-RS port and a reference antenna of a joint access point group according to an embodiment of this application.

In an example, it is assumed that the quantity of CSI-RS ports is 4. It is assumed that K is 1. To be specific, RRU #0, RRU #1, and RRU #2 are grouped into a joint access point group. The joint access point group may be represented as RRU #0/1/2. When RRU #0/1/2 jointly sends the CSI-RS, a mapping relationship between a reference antenna of RRU #0, RRU #1, or RRU #2 and port 0, port 1, port 2, or port 3 in the CSI-RS ports may be listed in FIG. 8. That is, port 0 is mapped to the reference antenna of RRU #0, port 1 is mapped to the reference antenna of RRU #1, port 2 is mapped to the reference antenna of RRU #0, and port 3 is mapped to the reference antenna of RRU #2. Alternatively, when RRU #0/1/2 jointly sends the CSI-RS, a mapping relationship between a reference antenna of RRU #0, RRU #1, or RRU #2 and port 0, port 1, port 2, or port 3 in the CSI-RS ports may be listed in FIG. 9. That is, port 0 is mapped to the reference antenna of RRU #0, port 1 is mapped to the reference antenna of RRU #1, port 2 is mapped to the reference antenna of RRU #2, and a port resource of port 3 is reserved.

In an example, it is assumed that the quantity of CSI-RS ports is 4. K is 3, and RRU #0/1, RRU #0/2, and RRU #1/2 are respectively used to represent three joint access point groups. When RRU #0/1 jointly sends the CSI-RS, port 0 and port 1 in the CSI-RS ports are respectively mapped to the reference antenna of RRU #0 and the reference antenna of RRU #1. When RRU #0/2 jointly sends the CSI-RS, port 0 and port 1 in the CSI-RS ports are respectively mapped to the reference antenna of RRU #0 and the reference antenna of RRU #2. When RRU #1/2 jointly sends the CSI-RS, port 0 and port 1 in the CSI-RS ports are respectively mapped to the reference antenna of RRU #1 and the reference antenna of RRU #2.

A mapping relationship between each access point and a CSI-RS port may be configured with reference to a feature of a codebook in an actual application, and is not limited to a specific example.

In step 310, the network side device obtains the channel state information CSI corresponding to each of the M access points, where the CSI corresponding to the access point includes the first CSI, and the first CSI is the information that is measured based on the CSI-RS corresponding to the access point and fed back by the first user equipment. When the preset interval is the subband interval, the PMI in the CSI corresponding to the access point is fed back at a granularity of a subband.

After receiving the CSI-RS, the first user equipment measures the CSI based on the user equipment side CSI-RS receive period in the CSI-RS configuration information and feeds back the CSI. The CSI includes a rank indicator (RI), a precoding matrix indicator (PMI), and a channel quality indicator (CQI).

Refer to FIG. 4. When each access point periodically sends the CSI-RS at the time interval, the first user equipment may obtain CSI of different access points at different measurement moments.

Refer to FIG. 5 and FIG. 6. When each access point or each joint access point group periodically sends the CSI-RS at the time interval, the first user equipment may obtain CSI of different access points and phase calibration information between the access points at different measurement moments.

It should be noted that, when each access point and/or each joint access point group send/sends the CSI-RS at the time interval, CSI fed back by the first user equipment at the different measurement moments represents channel features of different access points. To prevent the first user equipment from filtering CQIs, PMIs, and RIs in the CSI fed back at the different measurement moments, the network side device may indicate the first user equipment whether to perform CSI filtering when feeding back the CSI. The network side device may specifically indicate, by using radio resource control (RRC) signaling or control signaling, the first user equipment whether to perform CSI filtering.

When each access point periodically sends the CSI-RS at the subband interval, the first user equipment may obtain CSI of different access points at a same measurement moment. When the CSI is fed back, the PMI is fed back at a granularity of at least a subband.

When each access point or each joint access point group periodically sends the CSI-RS at the subband interval, the first user equipment may obtain CSI of different access points and phase calibration information between the access points at a same measurement moment. When the CSI is fed back, the PMI is fed back at a granularity of at least a subband.

The user equipment does not distinguish the access points. When receiving a CSI-RS of any access point, the user equipment may measure CSI based on the CSI-RS and feed back the CSI. The CQI and the RI in the CSI may be fed back at a granularity of a subband, or may be fed back at a granularity of a fullband. When the access point and the joint access point group periodically send the CSI-RS at the subband interval, the PMI in the CSI needs to be fed back at a granularity of a subband. When the M access points independently send the CSI-RS, a subband interval at which any one of the M access points sends the CSI-RS is at least M times a frequency domain interval at which the first user equipment sends two adjacent PMIs, and the two adjacent PMIs are two PMIs adjacent to each other in frequency domain. When the M access points or the K joint access point groups send the CSI-RS to the first user equipment, a subband interval at which any one of the M access points or any one of the K joint access point groups sends the CSI-RS is at least M+K times a frequency domain interval at which the first user equipment sends two adjacent PMIs, and the two adjacent PMIs are two PMIs adjacent to each other in frequency domain.

CSI-RS polling is performed at the subband interval, to avoid CSI confusion between the access points when the first user equipment does not support signaling configuration about whether to perform CSI filtering in time domain.

In an embodiment, that the network side device obtains channel state information CSI corresponding to each of the M access points includes: The network side device obtains first joint CSI, where the first joint CSI is information that is measured based on a first joint CSI-RS and fed back by the first user equipment, and the first joint CSI-RS is a CSI-RS jointly sent by access points in a first joint access point group in the K joint access point groups. The measurement method includes: determining, based on rank indicators RIs and precoding matrix indicators PMIs in CSI corresponding to access points in a working set corresponding to the first user equipment and a PMI in CSI corresponding to the first joint access point group, a joint weight of coherent joint transmission corresponding to the working set, where the first joint access point group includes the access points in the working set.

When a plurality of access points perform joint transmission, the working set of the first user equipment includes at least two access points, and the at least two access points are configured to simultaneously provide a data service for the first user equipment.

According to the channel state information measurement method provided in this application, the network side device may obtain CSI of each access point in the working set of the first user equipment. A measurement set includes the M access points. A joint weight of coherent joint transmission corresponding to the measurement set is represented as:

$$W = \sum_{i \in C} W'\left(\sum_{j=1}^{i-1} N_j + a\right) Q_i \tilde{W}_i^\% \quad (1)$$

where C is the working set corresponding to the first user equipment, and a number of an element in the working set corresponds to a number of an access point in the working set in the measurement set; the measurement set is a set including the M access points; $N_j$ represents a quantity of physical antennas of a $j^{th}$ access point in the measurement set;

$$W'\left(\sum_{j=1}^{i-1} N_j + a\right)$$

represents a compensation phase corresponding to a reference antenna of an $i^{th}$ access point in the working set, where a corresponds to the reference antenna of the $i^{th}$ access point in the working set, the reference antenna is a physical antenna to which a CSI-RS port is mapped when the access points in the first joint access point group jointly send the CSI-RS, and a is a number or a sequence number corresponding to the reference antenna, and preferably, a=1; $Q_i$ is a mapping matrix of a CSI-RS port to a physical antenna of the $i^{th}$ access point in the working set; $W_i^\%$ represents a weight obtained after phase normalization is performed on a precoding weight $W_i$ corresponding to a PMI that is fed back by the first user equipment based on the CSI-RS sent by the $i^{th}$ access point in the working set, where the phase normalization is performed based on the reference antenna on each rank, and the rank herein is a rank indicated by an RI fed back by the $i^{th}$ access point in the working set, for example, if the RI is 2, the RI indicates two ranks;

$$\tilde{W}_i^\%(:, k) = W_i(:, k)\frac{|W_i(a, k)|}{W_i(a, k)},$$

where $W_i(:, k)$ represents a $k^{th}$ column of a matrix corresponding to the precoding weight $W_i$, and $W_i(a, k)$ represents an $a^{th}$ element in the $k^{th}$ column of the matrix corresponding to the weight $W_i$; and W' represents a weight obtained after amplitude normalization is performed on each element of a precoding weight between the access points in the first joint access point group, where the amplitude normalization means that an amplitude of each element in the matrix is set to 1 and a phase is reserved, and a form of the element obtained through the normalization is $e^{j\theta}$; and a joint weight corresponding to the access points in the working set is a row corresponding to physical antennas of the access points in the working set in W.

A mapping matrix of antennas of the access points in the working set may be obtained in the following manner.

Manners in which the CSI-RS ports are mapped to the physical antennas of the access points at different CSI-RS transmit moments are represented by using a matrix, where a row of the matrix represents sequence numbers of the physical antennas of the access points, and a column of the matrix represents sequence numbers of the CSI-RS ports. An element in the matrix indicates whether there is a mapping relationship between a CSI-RS port corresponding to a column and a physical antenna corresponding to a row. "1" indicates that a CSI-RS port corresponding to a column is mapped to a physical antenna corresponding to a row; and "0" indicates that there is no mapping relationship between a CSI-RS port corresponding to a column and a physical antenna corresponding to a row. It may be assumed that the measurement set including the M access points is {RRU #1, RRU #2, RRU #M}. Physical antennas of {RRU #1, RRU #2, RRU #M} are correspondingly arranged in a column order, where antennas of RRU #1 are represented as $Tx_1^1$ to $Tx_1^{N_1}$, antennas of RRU #2 are represented as $Tx_2^1$ to $Tx_2^{N_1}$, ..., and antennas of RRU #M are represented as $Tx_M^1$ to $Tx_M^{N_M}$.

A mapping matrix of a CSI-RS port to a physical antenna at a transmit moment of RRU #1 may be represented as:

$$Q_1 = \begin{bmatrix} & p1 & p2 & \ldots & pN \\ Tx_1^1 & 1 & 0 & \ldots & 0 \\ Tx_1^2 & 0 & 1 & \ldots & 0 \\ \vdots & \vdots & \vdots & \vdots & \vdots \\ Tx_1^{N_1} & 0 & 0 & \ldots & 1 \\ Tx_2^1 & 0 & 0 & \ldots & 0 \\ Tx_2^2 & 0 & 0 & \ldots & 0 \\ \vdots & \vdots & \vdots & \vdots & \vdots \\ Tx_2^{N_2} & 0 & 0 & \ldots & 0 \\ \ldots & \ldots & \ldots & \ldots & \ldots \\ Tx_M^1 & 0 & 0 & \ldots & 0 \\ Tx_M^2 & 0 & 0 & \ldots & 0 \\ \vdots & \vdots & \vdots & \vdots & \vdots \\ Tx_M^{N_M} & 0 & 0 & \ldots & 0 \end{bmatrix} \quad (2)$$

The mapping matrix indicates that a reference signal of each CSI-RS port is sent only on a physical antenna corresponding to RRU #1, and is not sent on an antenna corresponding to another RRU.

A mapping matrix of a CSI-RS port to a physical antenna at a transmit moment of RRU #2 may be represented as:

$$Q_2 = \begin{bmatrix} & p1 & p2 & \ldots & pN \\ Tx_1^1 & 0 & 0 & \ldots & 0 \\ Tx_1^2 & 0 & 0 & \ldots & 0 \\ \vdots & \vdots & \vdots & \vdots & \vdots \\ Tx_1^{N_1} & 0 & 0 & \ldots & 0 \\ Tx_2^1 & 1 & 0 & \ldots & 0 \\ Tx_2^2 & 0 & 1 & \ldots & 0 \\ \vdots & \vdots & \vdots & \vdots & \vdots \\ Tx_2^{N_2} & 0 & 0 & \ldots & 1 \\ \ldots & \ldots & \ldots & \ldots & \ldots \\ Tx_M^1 & 0 & 0 & \ldots & 0 \\ Tx_M^2 & 0 & 0 & \ldots & 0 \\ \vdots & \vdots & \vdots & \vdots & \vdots \\ Tx_M^{N_M} & 0 & 0 & \ldots & 0 \end{bmatrix} \quad (3)$$

The mapping matrix indicates that a reference signal of each CSI-RS port is sent only on a physical antenna corresponding to RRU #2, and is not sent on an antenna corresponding to another RRU.

A mapping matrix of a CSI-RS port to a physical antenna at a transmit moment of RRU #M may be represented as:

$$Q_M = \begin{bmatrix} & p1 & p2 & \ldots & pN \\ Tx_1^1 & 0 & 0 & \ldots & 0 \\ Tx_1^2 & 0 & 0 & \ldots & 0 \\ \vdots & \vdots & \vdots & \vdots & \vdots \\ Tx_1^{N_1} & 0 & 0 & \ldots & 0 \\ Tx_2^1 & 0 & 0 & \ldots & 0 \\ Tx_2^2 & 0 & 0 & \ldots & 0 \\ \vdots & \vdots & \vdots & \vdots & \vdots \\ Tx_2^{N_2} & 0 & 0 & \ldots & 0 \\ \ldots & \ldots & \ldots & \ldots & \ldots \\ Tx_M^1 & 1 & 0 & \ldots & 0 \\ Tx_M^2 & 0 & 1 & \ldots & 0 \\ \vdots & \vdots & \vdots & \vdots & \vdots \\ Tx_M^{N_M} & 0 & 0 & \ldots & 1 \end{bmatrix} \quad (4)$$

The mapping matrix indicates that a reference signal of each CSI-RS port is sent only on a physical antenna corresponding to RRU #M, and is not sent on an antenna corresponding to another RRU.

For example, K=1. The access points in the first joint access point group are RRU #1, RRU #2, ..., and RRU #M.

For the first joint access point group, a mapping matrix of a CSI-RS port to a reference antenna of each access point may be represented as:

$$Q_{M+1} = \begin{bmatrix} & p1 & p2 & \ldots & pM & \ldots & pN \\ Tx_1^1 & 1 & 0 & \ldots & 0 & \ldots & 0 \\ Tx_1^2 & 0 & 0 & \ldots & 0 & \ldots & 0 \\ \vdots & \vdots & \vdots & \vdots & 0 & \vdots & \vdots \\ Tx_1^{N_1} & 0 & 0 & \ldots & 0 & \ldots & 0 \\ Tx_2^1 & 0 & 1 & \ldots & 0 & \ldots & 0 \\ Tx_2^2 & 0 & 0 & \ldots & 0 & \ldots & 0 \\ \vdots & \vdots & \vdots & \vdots & 0 & \vdots & \vdots \\ Tx_2^{N_2} & 0 & 0 & \ldots & 0 & \ldots & 0 \\ \ldots & \ldots & \ldots & \ldots & 0 & \ldots & \ldots \\ Tx_M^1 & 0 & 0 & \ldots & 1 & \ldots & 0 \\ Tx_M^2 & 0 & 0 & \ldots & 0 & \ldots & 0 \\ \vdots & \vdots & \vdots & \vdots & 0 & \vdots & \vdots \\ Tx_M^{N_M} & 0 & 0 & \ldots & 0 & \ldots & 0 \end{bmatrix} \quad (5)$$

The mapping matrix indicates: A first physical antenna in physical antennas of RRU #1 is mapped to CSI-RS port 1 (where the physical antenna is used as a reference antenna of RRU #1); a first physical antenna in physical antennas of RRU #2 is mapped to CSI-RS port 2 (where the physical antenna is used as a reference antenna of RRU #2); . . . ; and a first physical antenna in physical antennas of RRU #M is mapped to CSI-RS port M (where the physical antenna is used as a reference antenna of RRU #M).

For the first joint access point group, a mapping matrix of a CSI-RS port to a reference antenna of each access point may be alternatively designed with reference to a codebook definition manner in a related protocol standard, that is, a reference antenna of each access point is mapped to a CSI-RS port on which a codebook is accurately quantized. A specific mapping manner is not limited in the present invention.

When a precoding weight corresponding to a PMI in CSI fed back by the first joint access point group is $W_{M+1}$, a phase calibration weight $W_{Cali}$ of the first user equipment is obtained according to the following formula:

$$W_{Cali} = Q_{M+1} W_{M+1}(:,1) \quad (6)$$

Amplitude normalization is performed on each non-zero element in $W_{Cali}$, and only phase information $e^{j\theta}$ is retained, to obtain a phase compensation matrix W' in the formula (1). $W_{M+1}(:, 1)$ is the 1$^{st}$ column of a precoding weight $W_{M+1}$ of a PMI that is fed back by the first user equipment based on the CSI-RS sent by the first joint access point group.

For example, when the working set of the first user equipment is {RRU #1, RRU #3}, C={1, 3}, and the reference antenna is a=1 according to the formula (1)

$$W = \sum_{i \in C} W' \left( \sum_{j=1}^{i-1} N_j + a \right) Q_i W_i = $$

$$W'(1) Q_1 W_1 + W'(N_1 + N_2 + 1) Q_3 W_3 = \begin{bmatrix} W'(1) W_1 \\ O_2 \\ W'(3) W_3 \\ O_4 \\ \vdots \\ O_M \end{bmatrix}$$

where $O_i$ represents an all-zero matrix of $N_i \times r$ dimensions, and r represents a minimum value in the RIs of the CSI corresponding to the access points in the working set.

A joint weight corresponding to the access points in the working set is a row corresponding to physical antennas of the access points in the working set in W. That is, the joint weight of coherent joint transmission corresponding to the working set {RRU #1, RRU #3} of the first user equipment is:

$$W = \begin{bmatrix} W'(1) W_1 \\ W'(3) W_3 \end{bmatrix}$$

In this embodiment, a joint weight of coherent joint transmission of coordinated access points may be obtained, thereby avoiding mismatch between a codebook and an antenna form.

In an embodiment, the measurement method includes: determining, based on rank indicators RIs and precoding matrix indicators PMIs in CSI corresponding to access points in a working set corresponding to the first user equipment, a joint weight of non-coherent joint transmission corresponding to the working set, where the M access points include the access points in the working set.

In an example of this embodiment, a joint weight of non-coherent joint transmission corresponding to a measurement set is represented as:

$$W = \sum_{i \in C} Q_i W_i \quad (7)$$

where C is the working set corresponding to the first user equipment, and a number of an element in the working set corresponds to a number of an access point in the working set in the measurement set; the measurement set is a set including the M access points; $Q_i$ is a mapping matrix of a CSI-RS port to an antenna of an i$^{th}$ access point in the working set; and $W_i$ represents a precoding weight corresponding to a PMI that is fed back by the first user equipment based on the CSI-RS sent by the i$^{th}$ access point in the working set; and a joint weight corresponding to the access points in the working set is a row corresponding to physical antennas of the access points in the working set in W.

For a mapping matrix of each access point, refer to the descriptions in the foregoing embodiment. Details are not described herein again.

In an example of this embodiment, a joint weight of non-coherent joint transmission corresponding to a measurement set is represented as:

$$W = [Q_{C_1} W_{C_1} L \; Q_{C_g} W_{C_g}] \quad (8)$$

where C is the working set corresponding to the first user equipment, and a number of an element in the working set corresponds to a number of an access point in the working set in the measurement set; the measurement set is a set including the M access points; $C_i$ represents a number of an i$^{th}$ access point in the working set in the measurement set; $Q_i$ is a mapping matrix of a CSI-RS port to an antenna of the i$^{th}$ access point in the working set; and $W_i$ represents a precoding weight corresponding to a PMI that is fed back by the first user equipment based on the CSI-RS sent by the i$^{th}$ access point in the working set; and a joint weight corresponding to the access points in the working set is a row corresponding to physical antennas of the access points in the working set in W.

In this example, to match the CSI fed back by the first user equipment with non-coherent joint transmission, the network side device configures, through codebook subset restriction, the first user equipment to feed back the CSI based on rank (rank) 1.

In this embodiment, a joint weight of non-coherent joint transmission of coordinated access points may be obtained, thereby avoiding mismatch between a codebook and an antenna form.

Three joint weights may be obtained by using the foregoing embodiment. When sending data to a user equipment whose working set has two or more access points, the network side device may flexibly select from three joint weights, to perform data precoding processing.

In an embodiment, the CSI-RS transmit information is used to indicate M1 access points to periodically send a CSI-RS to each second user equipment in a second user equipment set at a preset interval. CSI corresponding to each access point includes a second CSI set, and the second CSI set includes information that is measured based on the CSI-RS corresponding to the access point and fed back by the second user equipment. The M access points include a working set of the first user equipment, and the M1 access points include a working set of the second user equipment. The working set of the first user equipment includes at least one access point, and the working set of the second user equipment includes at least one access point. The M access points overlap or are the same as the M1 access points.

The measurement method further includes: determining, based on a PMI in CSI between the working set of the second user equipment in the second user equipment set and the first user equipment, a first weight and a first SINR linear value between the access point in the working set of the second user equipment and the first user equipment; and determining, based on a PMI in CSI between the working set of the first user equipment and the second user equipment, a second weight and a second SINR linear value between the access point in the working set of the first user equipment and the second user equipment, where a measurement set of the first user equipment overlaps the working set of the second user equipment in the second user equipment set when the working set of the second user equipment schedules a corresponding second user equipment, determining, based on a PMI in CSI between the working set of the second user equipment and the corresponding second user equipment, a third weight between the access point in the working set of the second user equipment and the corresponding second user equipment; and when the working set of the first user equipment schedules the first user equipment, determining, based on a PMI in CSI between the working set of the first user equipment and the first user equipment, a fourth weight between the access point in the working set of the first user equipment and the first user equipment;

determining, based on the first weight, the third weight of the second user equipment, and the first SINR linear value, first interference information of the working set of the second user equipment to the first user equipment when the working set of the second user equipment schedules the corresponding second user equipment; and determining, based on the second weight of the second user equipment, the fourth weight, and the second SINR linear value of the second user equipment, information about second interference of the working set of the first user equipment to the second user equipment when the working set of the first user equipment schedules the first user equipment;

determining a sum of metric values of the first user equipment and the second user equipment based on the first interference information and the second interference information;

determining a coordinated second user equipment based on the sum of the metric values of the first user equipment and the second user equipment; and determining a coordination mode between the first user equipment and the coordinated second user equipment based on a sum of metric values of the coordinated second user equipment and the first user equipment.

The metric value may be an SINR-based metric value, a data throughput-based metric value, or a metric value obtained through proportional fair scheduling.

In an example, when there are two or more access points in the working set of the first user equipment or a working set of the coordinated second user equipment, the network side device may generate the joint weight according to the foregoing joint weight generation solution, to perform data precoding processing.

Figure 10:
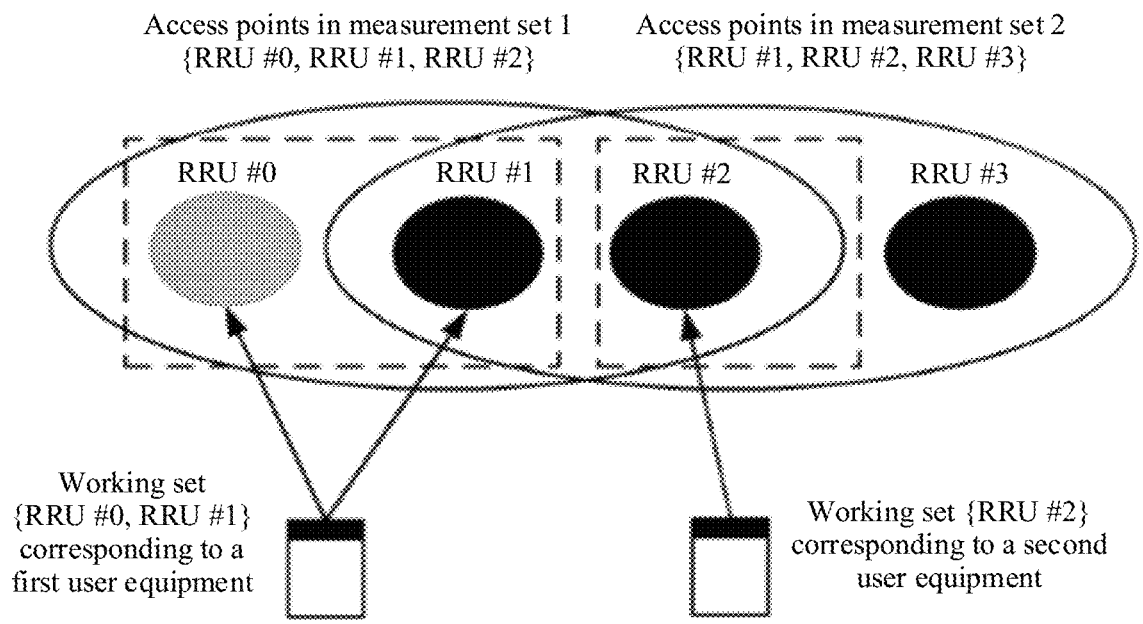
FIG. 10 is a schematic diagram of a relationship between a measurement set and a working set of a first user equipment and a measurement set and a working set of a second user equipment according to an embodiment of this application.

Refer to FIG. 10. It is assumed that M=3, M1=3, a measurement set of the first user equipment is measurement set 1, namely, {RRU #0, RRU #1, RRU #2}, and a measurement set of the second user equipment set is measurement set 2, namely, {RRU #1, RRU #2, RRU #3}. The second user equipment set includes at least one second user equipment. The measurement set of the second user equipment set is measurement sets of second user equipments in the second user equipment set. A working set of the first user equipment is {RRU #0, RRU #1}, and a working set of each second user equipment in the second user equipment set includes {RRU #2}.

Figure 11:
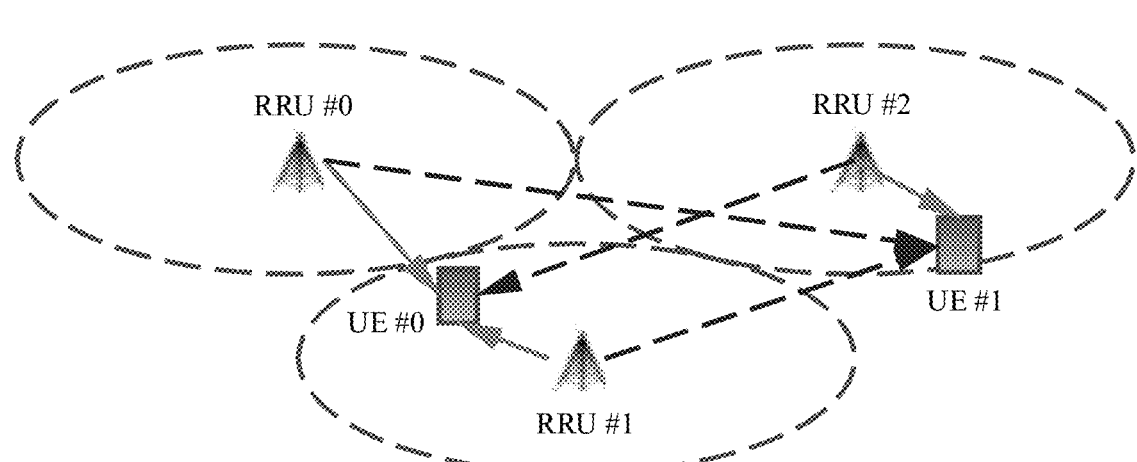
FIG. 11 is a schematic diagram of a working relationship between a working set of a first user equipment and a working set of a second user equipment according to an embodiment of this application.

Refer to FIG. 11. It is assumed that M is 3, K is 1, and the access points are RRU #0, RRU #1, and RRU #2. A CSI-RS transmit period of each access point is 4*T. It is assumed that the first user equipment is UE #0, a working set of any second user equipment in the second user equipment set includes {RRU #2}, and the second user equipment is UE #1.

CSI fed back by UE #0 in 4*T measurement periods is $CSI_{0,0}$, $CSI_{1,0}$, ..., and $CSI_{3,0}$ respectively.

CSI fed back by UE #1 in 4*T measurement periods is $CSI_{0,1}$, $CSI_{1,1}$, ..., and $CSI_{3,1}$ respectively.

$CSI_{i,j}$ includes information $RI_{i,j}$, $PMI_{i,j}$, and $CQI_{i,j}$, and a precoding weight corresponding to $PMI_{i,j}$ is denoted as $W_{i,j}$.

Refer to FIG. 10. UE #0 is used as a preferentially scheduled user, and the working set of UE #0 includes RRU #0 and RRU #1. CSI of UE #0 on RRU #0 and RRU #1 and CSI between RRU #2 and UE #0 are obtained based on CSI fed back by UE #0.

The network side device estimates, based on the CSI between RRU #2 and UE #0, interference of RRU #2 to UE #0 when RRU #2 schedules UE #1. The network side device estimates, based on CSI between RRU #0 and RRU #1 and UE #1, interference of RRU #0 and RRU #1 to UE #1 when RRU #0 and RRU #1 schedule UE #0. Then, signal to interference plus noise ratios (SINRs) of UE #0 and UE #1 under interference are calculated. Specific implementation steps are as follows:

(1) Obtain a precoding weight $W_{2,0}$ between RRU #2 and UE #0 based on a PMI in the CSI between RRU #2 and UE #0.

(2) Obtain, based on the CSI fed back by UE #1, a weight $W_{2,1}$ between RRU #2 and UE #1 when RRU #2 schedules UE #1.

(3) Calculate a correlation coefficient between each rank of $W_{2,1}$ and each rank of $W_{2,0}$, and calculate an average correlation coefficient on each codeword stream based on a mapping relationship between a codeword stream and a rank defined in a protocol.

(4) Obtain a corresponding SINR linear value based on a CQI in the CSI between RRU #2 and UE #0, and estimate, based on the correlation coefficient in step (3), interference leakage from RRU #2 to UE #0 when RRU #2 schedules UE #1.

Interference leakage from RRU #0 and RRU #1 to UE #1 may be estimated based on precoding weights between RRU #0 and RRU #1 and UE #1, precoding weights between RRU #0 and RRU #1 and UE #0, or CQIs in CSI between RRU #0 and RRU #1 and UE #1 by using a method that is the same as steps (1) to (4).

(5) Calculate a sum of metric values of UE #0 and UE #1 when interference leakage exists.

(6) A sum of metric values of the second user equipment in the second user equipment set and the first user equipment may be calculated by using the method that is the same as steps (1) to (4).

(7) A second user equipment that is of the second user equipments and that has a maximum sum of metric values with the first user equipment is used as a coordinated second user equipment to pair with the first user equipment. If the sum of the metric values of the first user equipment and the coordinated second user equipment is greater than a metric value obtained during independent scheduling of UE #0, the pairing succeeds. The network side device may perform reuse transmission on the first user equipment and the coordinated second user equipment. This transmission mode may be referred to as beamforming based coordinated scheduling (CSBF) coordination. If the sum of the metric values of the first user equipment and the coordinated second user equipment is less than a metric value obtained during independent scheduling of UE #0, RRU #2 keeps silent. This is referred to as dynamic point selection (DPB) coordination. The independent scheduling of the first user equipment means that when the working set of the first user equipment schedules the first user equipment, an access point (e.g., RRU #2 described above) in an overlapping part of the working set of the second user equipment and the measurement set of the first user equipment does not schedule the corresponding second user equipment, that is, refers to the foregoing DPB coordination.

For UE #0, the network side device may generate the joint weight according to the foregoing joint weight generation solution, to perform data precoding processing.

In this embodiment, the network side device may estimate, based on a scheduling result of each coordinated access point and usage of a PMI, a magnitude of interference between the coordinated access points, and then calculate an SINR value corresponding to a user equipment under interference. In addition, the network side device determines, through table lookup, a coordination mode and a modulation and coding scheme (MCS) value of each scheduled user, to obtain a more accurate joint adaptive modulation and coding (AMC) effect.

In an embodiment, before the network side device configures the channel state information reference signal CSI-RS transmit information of the M access points, the measurement method further includes: The network side device determines the M access points based on a reference signal received power (RSRP) fed back by the first user equipment.

In an embodiment, before the network side device configures the channel state information reference signal CSI-RS transmit information of the M access points, the measurement method further includes: The network side device measures the RSRP based on a sounding reference signal (SRS) sent by the first user equipment; and determines the M access points based on the measured RSRP.

Specifically, the network side device may determine a threshold $\gamma$, and initially set the measurement set of the first user equipment as a primary access point of the first user equipment, where a quantity M of access points in the measurement set is 1; and calculate a difference between an RSRP between another access point and the first user equipment and an RSRP between the primary access point of the first user equipment and the first user equipment. When the RSRP difference is greater than $\gamma$, the access point is added to the measurement set; or when the RSRP difference is less than or equal to $\gamma$, the access point is not added to the measurement set.

The following describes a simulation experiment in which a joint weight of coherent joint transmission is generated according to a method for generating a joint weight of coherent joint transmission provided in this embodiment of this application for downlink joint transmission (JT). It is assumed that access points in a measurement set of the user equipment are RRU #0, RRU #1, and RRU #2; RRU #0, RRU #1, and RRU #2 are grouped into a joint access point group, namely, RRU #0/1/2; and a first physical antenna of each RRU is used as a reference antenna. Then, CSI measurement is performed according to a time-division CSI-RS transmission method described in this embodiment of this application, and the joint weight of coherent joint transmission is generated according to the method for generating a joint weight of coherent joint transmission described in this embodiment of this application for downlink transmission.

Figure 12:
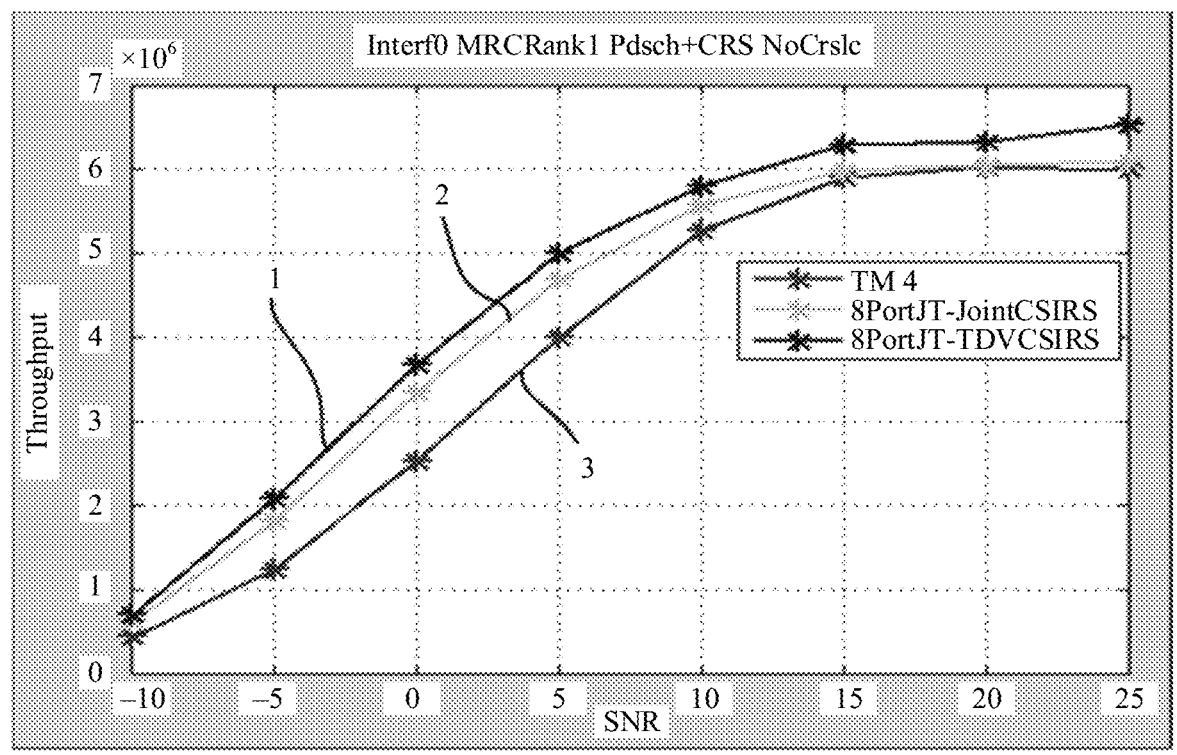
FIG. 12 is a diagram showing simulation performance corresponding to a channel state information measurement method according to an embodiment of this application.
Figure 13:
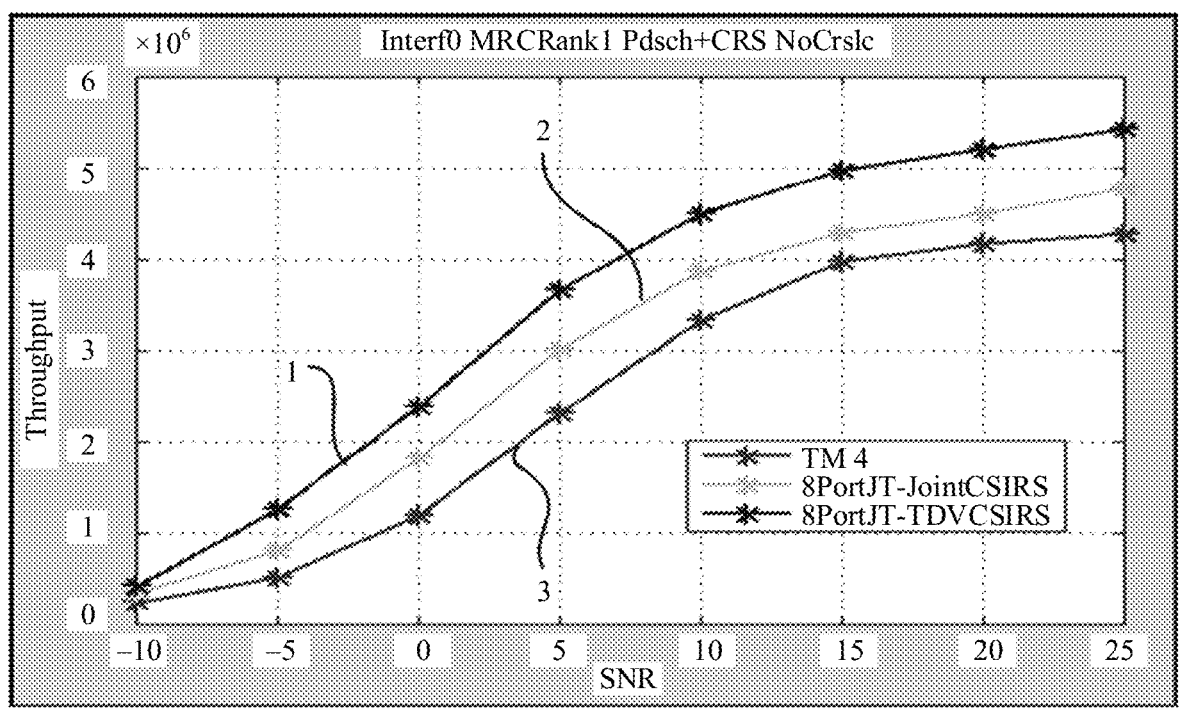
FIG. 13 is a diagram showing simulation performance corresponding to a channel state information measurement method according to an embodiment of this application.

FIG. 12 and FIG. 13 show performance of joint transmission based on a micro channel at different moving speeds of a user equipment according to a measurement method corresponding to a combination of RRU #0, RRU #1, RRU #2, and RRU #0/1/2 and a method for generating a joint weight of coherent joint transmission. In addition, the performance is compared with performance of joint CSI-RS joint transmission in a current technology and performance of TM 4. In FIG. 12 and FIG. 13, curve 1 is a data throughput curve for testing multipoint joint transmission by performing CSI measurement according to the time-division CSI-RS transmission method described in this embodiment of this application, curve 2 is a data throughput curve of multipoint joint transmission during joint CSI-RS transmission in the current technology, and curve 3 is a data throughput curve of TM 4. In FIG. 12, a moving speed of the user equipment is 3 km/h. In FIG. 13, a moving speed of the user equipment is 15 km/h. It can be learned from FIG. 12 and FIG. 13 that a higher data throughput is ensured by generating a joint weight of coherent joint transmission according to this embodiment of this application for downlink joint transmission (JT).

According to the channel state information measurement method provided in the embodiments of this application, when the user equipment supports configuration of only one CSI-RS, the CSI-RS is sent in a time division/frequency division manner, to obtain relatively independent CSI of different coordinated access points. On one hand, a codebook mismatch problem in multi-coordinated joint CSI-RS joint transmission can be avoided. On the other hand, a network side can be assisted in coordination and management of inter-cell interference.

Figure 14:
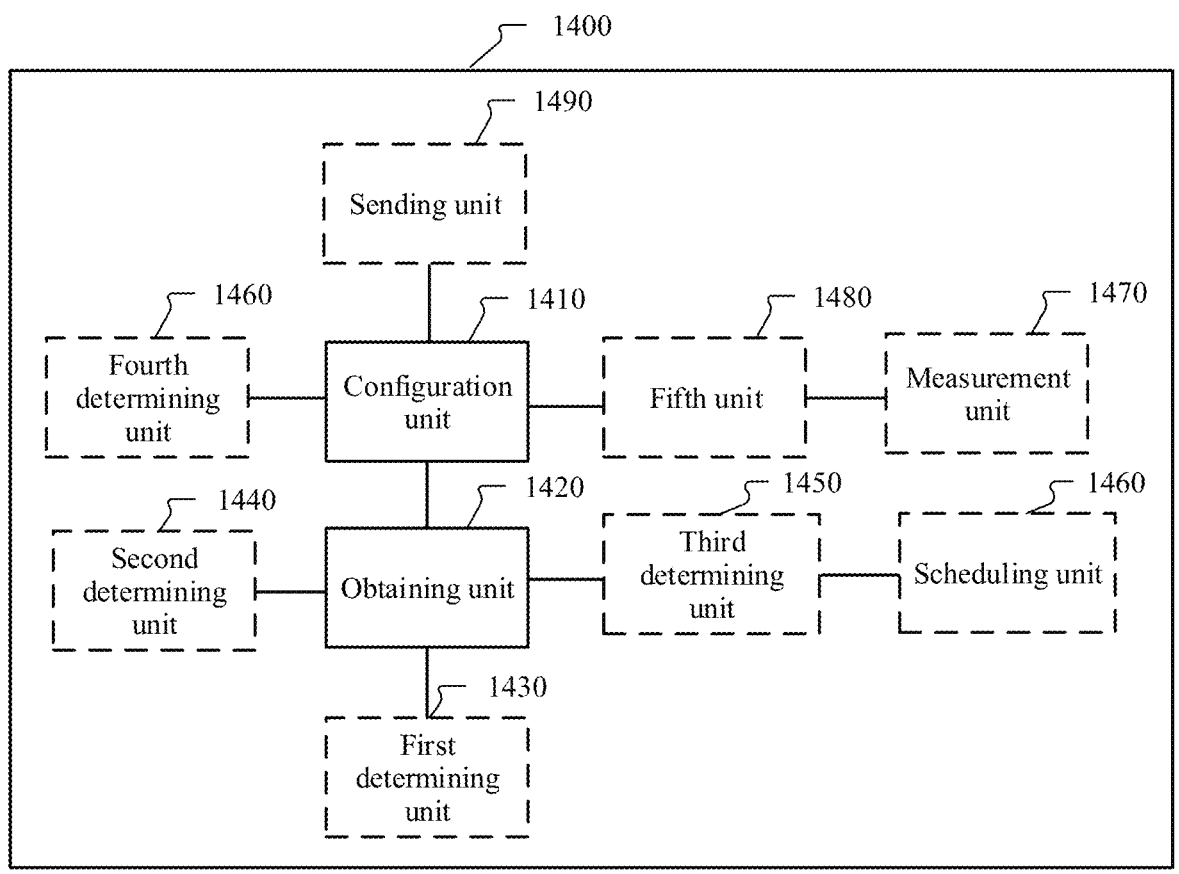
FIG. 14 is a schematic block diagram of a channel state information measurement apparatus according to an embodiment of this application.

An embodiment of this application provides a channel state information measurement apparatus 1400. As shown in FIG. 14, the measurement apparatus 1400 includes:

a configuration unit 1410, configured to configure channel state information reference signal CSI-RS transmit information of M access points, where the CSI-RS transmit information is used to indicate the M access points to periodically send a CSI-RS to a first user equipment at a preset interval, the preset interval is a time interval and/or a subband interval, and M is an integer greater than 1; and an obtaining unit 1420, configured to obtain channel state information CSI corresponding to each of the M access points, where the CSI corresponding to the access point includes first CSI, and the first CSI is information that is measured based on the CSI-RS corresponding to the access point and fed back by the first user equipment, where when the preset interval is the subband interval, a PMI in the CSI corresponding to the access point is fed back at a granularity of a subband.

In an embodiment, when the preset interval is the subband interval, that the M access points periodically send the CSI-RS to the first user equipment at the preset interval includes: The M access points send the CSI-RS in polling mode in any system bandwidth at the subband interval.

In an embodiment, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

In an example of this embodiment, when the preset interval is the subband interval, that the M access points or K joint access point groups periodically send the CSI-RS to the first user equipment at the preset interval includes: The M access points or the K joint access point groups send the CSI-RS in polling mode in any system bandwidth at the subband interval.

In an example of this embodiment, that the M access points or K joint access point groups periodically send the CSI-RS to the first user equipment at the preset interval includes: determining a reference antenna of each access point in a first joint access point group; and mapping each port in a first CSI-RS to the reference antenna of the access point in the first joint access point group, where the reference antenna of the access point in the first joint access point group is mapped to at least one port.

In an example of this embodiment, the obtaining unit 1420 is configured to obtain first joint CSI, where the first joint CSI is information that is measured based on a first joint CSI-RS and fed back by the first user equipment, and the first joint CSI-RS is a CSI-RS jointly sent by access points in a first joint access point group in the K joint access point groups.

The measurement apparatus 1400 further includes a first determining unit 1430, configured to determine, based on rank indicators RIs and precoding matrix indicators PMIs in CSI corresponding to access points in a working set corresponding to the first user equipment and a PMI in CSI corresponding to the first joint access point group, a joint weight of coherent joint transmission corresponding to the working set, where the first joint access point group includes the access points in the working set.

In an example of this embodiment, a joint weight of coherent joint transmission corresponding to a measurement set is represented as:

$$W = \sum_{i \in C} W'\left(\sum_{j=1}^{i-1} N_j + a\right) Q_i \tilde{W}_i^\circ$$

where C is the working set corresponding to the first user equipment, and a number of an element in the working set corresponds to a number of an access point in the working set in the measurement set; the measurement set is a set including the M access points; $N_j$ represents a quantity of physical antennas of a $j^{th}$ access point in the measurement set;

$$W'\left(\sum_{j=1}^{i-1} N_j + a\right)$$

represents a compensation phase corresponding to a reference antenna of an $i^{th}$ access point in the working set; $Q_i$ is a mapping matrix of a CSI-RS port to a physical antenna of the $i^{th}$ access point in the working set; $W_i^\circ$ represents a weight obtained after phase normalization is performed on a precoding weight $W_i$ corresponding to a PMI that is fed back by the first user equipment based on the CSI-RS sent by the $i^{th}$ access point in the working set, where the phase normalization is performed based on the reference antenna on each rank indicated by an RI;

$$\tilde{W}_i^\circ(:, k) = W_i(:, k) \frac{|W_i(a, k)|}{W_i(a, k)},$$

where $W_i(:, k)$ represents a $k^{th}$ column of a matrix corresponding to the precoding weight $W_i$, and $W_i(a, k)$ represents an $a^{th}$ element in the $k^{th}$ column of the matrix corresponding to the weight $W_i$, where a corresponds to the reference antenna of the $i^{th}$ access point in the working set, and the reference antenna is a physical antenna to which the CSI-RS port is mapped when the access points in the first joint access point group jointly send the CSI-RS; and W' represents a weight obtained after amplitude normalization is performed on each element of a precoding weight $W_{Cal.}$ between the access points in the first joint access point group, and $W_{Cali}=Q_{M+1}W_{M+1}(:, 1)$, where $Q_{M+1}$ is a mapping matrix of reference antennas of the access points in the first joint access point group when the access points in the first joint access point group jointly send the CSI-RS, and $W_{M+1}(:, 1)$ is the $1^{st}$ column of a precoding weight $W_{M+1}$ of a PMI that is fed back by the first user equipment based on the CSI-RS sent by the first joint access point group; and a joint weight corresponding to the access points in the working set is a row corresponding to physical antennas of the access points in the working set in W.

In an embodiment, the measurement apparatus includes a second determining unit 1440, configured to determine, based on rank indicators RIs and precoding matrix indicators PMIs in CSI corresponding to access points in a working set corresponding to the first user equipment, a joint weight of non-coherent joint transmission corresponding to the working set, where the M access points include the access points in the working set.

In an example of this embodiment, a joint weight of non-coherent joint transmission corresponding to a measurement set is represented as:

$$W = \sum_{i \in C} Q_i W_i$$

where C is the working set corresponding to the first user equipment, and a number of an element in the working set corresponds to a number of an access point in the working set in the measurement set; the measurement set is a set including the M access points; $Q_i$ is a mapping matrix of a CSI-RS port to an antenna of an $i^{th}$ access point in the working set; and $W_i$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In an example of this embodiment, a joint weight of non-coherent joint transmission corresponding to a measurement set is represented as:

$$W = [Q_{C_1} W_{C_1} L \ Q_{C_g} W_{C_g}]$$

where C is the working set corresponding to the first user equipment, and a number of an element in the working set corresponds to a number of an access point in the working set in the measurement set; the measurement set is a set including the M access points; $C_i$ represents a number of an $i^{th}$ access point in the working set in the measurement set; g represents a quantity of access points in the working set; $Q_{Ci}$ is a mapping matrix of a CSI-RS port to an antenna of the $i^{th}$ access point in the working set; and $W_{Ci}$ represents a precoding weight corresponding to a PMI that is fed back by the first user equipment based on the CSI-RS sent by the $i^{th}$ access point in the working set; and a joint weight corresponding to the access points in the working set is a row corresponding to physical antennas of the access points in the working set in W.

In an embodiment, the CSI-RS transmit information is used to indicate M1 access points to periodically send a CSI-RS to each second user equipment in a second user equipment set at a preset interval. CSI corresponding to each access point includes a second CSI set, and the second CSI set includes information that is measured based on the CSI-RS corresponding to the access point and fed back by the second user equipment. The M access points include a working set of the first user equipment, and the M1 access points include a working set of the second user equipment. The working set of the first user equipment includes at least one access point, and the working set of the second user equipment includes at least one access point. The M access points overlap or are the same as the M1 access points.

The measurement apparatus includes a third determining unit 1450, configured to: determine, based on a PMI in CSI between the working set of the second user equipment in the second user equipment set and the first user equipment, a first weight and a first SINR linear value between the access point in the working set of the second user equipment and the first user equipment; and determine, based on a PMI in CSI between the working set of the first user equipment and the second user equipment, a second weight and a second SINR linear value between the access point in the working set of the first user equipment and the second user equipment, where a measurement set of the first user equipment overlaps the working set of the second user equipment in the second user equipment set.

The third determining unit 1450 is further configured to: when the working set of the second user equipment schedules a corresponding second user equipment, determine, based on a PMI in CSI between the working set of the second user equipment and the corresponding second user equipment, a third weight between the access point in the working set of the second user equipment and the corresponding second user equipment; and when the working set of the first user equipment schedules the first user equipment, determine, based on a PMI in CSI between the working set of the first user equipment and the first user equipment, a fourth weight between the access point in the working set of the first user equipment and the first user equipment.

The third determining unit 1450 is further configured to: determine, based on the first weight, the third weight of the second user equipment, and the first SINR linear value, first interference information of the working set of the second user equipment to the first user equipment when the working set of the second user equipment schedules the corresponding second user equipment; and determine, based on the second weight of the second user equipment, the fourth weight, and the second SINR linear value of the second user equipment, information about second interference of the working set of the first user equipment to the second user equipment when the working set of the first user equipment schedules the first user equipment.

The third determining unit 1450 is further configured to determine a sum of metric values of the first user equipment and the second user equipment based on the first interference information and the second interference information.

The third determining unit 1450 is further configured to determine a coordinated second user equipment based on the sum of the metric values of the first user equipment and the second user equipment.

The third determining unit 1450 is further configured to determine a coordination mode between the first user equipment and the coordinated second user equipment based on a sum of metric values of the coordinated second user equipment and the first user equipment.

In an example of this embodiment, the measurement apparatus 1400 further includes a scheduling unit 1460, configured to perform reuse transmission on the first user equipment and the coordinated second user equipment when the sum of the metric values of the coordinated second user equipment and the first user equipment is greater than a metric value obtained during independent scheduling of the first user equipment, where the independent scheduling of the first user equipment means that the working set of the second user equipment does not schedule the corresponding second user equipment when the working set of the first user equipment schedules the first user equipment.

In an example of this embodiment, the measurement apparatus 1400 further includes a scheduling unit 1460, configured to determine that the coordination mode is dynamic point blanking DPB coordination when the sum of the metric values of the coordinated second user equipment and the first user equipment is less than a metric value obtained during independent scheduling of the first user equipment.

In an embodiment, the CSI-RS transmit information includes CSI-RS configuration information, and the CSI-RS configuration information includes at least CSI-RS pilot sequence generation parameter information, CSI-RS port quantity information, resource mapping location information, subframe location offset information, and a user equipment side CSI-RS receive period.

When the preset interval is the time interval, duration of the time interval is equal to duration of the user equipment side CSI-RS receive period, and for any one of the M access points, duration of a CSI-RS transmit period is at least M times the duration of the user equipment side CSI-RS receive period; or when the preset interval is the subband interval, for any one of the M access points, duration of a CSI-RS transmit period is equal to duration of the user equipment side CSI-RS receive period.

The measurement apparatus 1400 further includes a sending unit 1490, configured to send the CSI-RS configuration information to the first user equipment, to enable the first user equipment to measure the CSI based on the CSI-RS configuration information and the CSI-RS that corresponds to the access point and feed back the CSI.

In a manner of this embodiment, that the M access points periodically send the CSI-RS to the first user equipment at the preset interval includes: The M access points or K joint access point groups periodically send the CSI-RS to the first user equipment at the preset interval, where the K joint access point groups are obtained by dividing the M access points into K groups, access points in any one of the K joint access point groups are configured to jointly send the CSI-RS, and K is a positive integer.

When the preset interval is the time interval, for any one of the M access points or any one of the K joint access point groups, the duration of the CSI-RS transmit period is M+K times the duration of the user equipment side CSI-RS receive period; or when the preset interval is the subband interval, for any one of the M access points or any one of the K joint access point groups, the duration of the CSI-RS transmit period is equal to the duration of the user equipment side CSI-RS receive period.

In an embodiment, the measurement apparatus 1400 further includes a fourth determining unit 1460, where the fourth determining unit 1460 is configured to determine the M access points based on a reference signal received power RSRP fed back by the first user equipment; or the measurement apparatus further includes a measurement unit 1470 and a fifth determining unit 1480, where the measurement unit 1470 is configured to measure the RSRP based on a sounding reference signal SRS sent by the first user equipment; and the fifth determining unit 1480 is configured to determine the M access points based on the measured RSRP.

For the measurement apparatus 1400 provided in this embodiment of this application, refer to the method embodiment shown in FIG. 3. Details are not described herein again.

According to the channel state information measurement apparatus provided in this embodiment of this application, when the user equipment supports configuration of only one CSI-RS, the CSI-RS is sent in a time division/frequency division manner, to obtain relatively independent CSI of different coordinated access points. On one hand, a codebook mismatch problem in multi-coordinated joint CSI-RS joint transmission can be avoided. On the other hand, a network side can be assisted in coordination and management of inter-cell interference.

Figure 15:
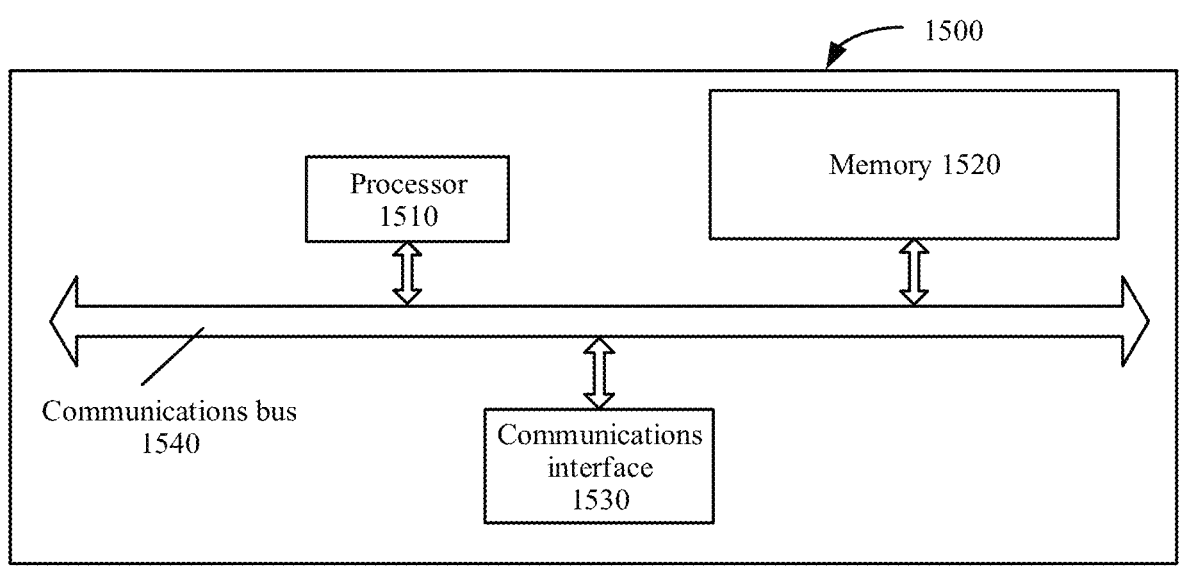
FIG. 15 is a schematic block diagram of a network side device according to an embodiment of this application.

An embodiment of this application provides a network side device 1500. As shown in FIG. 15, the network side device 1500 may include a processor 1510, a memory 1520, a communications interface 1530, and a bus 1540. The processor 1510, the memory 1520, and the communications interface 1530 in the network side device 1500 may establish a communications connection through the bus 1540.

The processor 1510 is configured to configure channel state information reference signal CSI-RS transmit information of M access points, where the CSI-RS transmit information is used to indicate the M access points to periodically send a CSI-RS to a first user equipment at a preset interval, the preset interval is a time interval and/or a subband interval, and M is an integer greater than 1.

The processor 1510 is configured to obtain channel state information CSI corresponding to each of the M access points, where the CSI corresponding to the access point includes first CSI, and the first CSI is information that is measured based on the CSI-RS corresponding to the access point and fed back by the first user equipment. When the preset interval is the subband interval, a PMI in the CSI corresponding to the access point is fed back at a granularity of a subband.

The processor 1510 may be a central processing unit (CPU).

The memory 1520 may include a volatile memory, for example, a random access memory (RAM); or the memory may include a nonvolatile memory, for example, a read-only memory (ROM), a flash memory, a hard disk drive (HDD), or a solid-state drive (SSD); or the memory 1520 may include a combination of the foregoing types of memories.

The channel state information measurement method provided in the foregoing embodiments may be performed by the processor 1510. Data such as CSI-RS transmit information is stored in the memory. In addition, the memory 1520 is further configured to store program instructions or the like that is executed by the processor to implement the measurement method described in the foregoing embodiments.

According to the network side device provided in this embodiment of this application, when the user equipment supports configuration of only one CSI-RS, the CSI-RS is sent in a time division/frequency division manner, to obtain relatively independent CSI of different coordinated access points. On one hand, a codebook mismatch problem in multi-coordinated joint CSI-RS joint transmission can be avoided. On the other hand, a network side can be assisted in coordination and management of inter-cell interference.

It should be noted that the processor in the embodiments of this application may be a central processing unit (CPU), may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor or any conventional processor.

The method steps in the embodiments of this application may be implemented in a hardware manner, or may be implemented in a manner of executing a software instruction by a processor. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network side device.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The available medium may be a magnetic medium (e.g., a floppy disk, a hard disk, or a magnetic tape), an optical medium (e.g., a DVD), a semiconductor medium (e.g., a solid-state disk (SSD)), or the like.

It may be understood that various numbers in the embodiments of this application are merely used for differentiation for ease of description, and are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The foregoing descriptions are merely specific implementations of the embodiments of this application. Any variation or replacement readily figured out by a person skilled in the art within the technical scope disclosed in this application shall fall within the protection scope in the embodiments of this application.

What is claimed is:

1. A channel state information measurement method, comprising:
    configuring, by a network side device, channel state information reference signal (CSI-RS) transmit information of M access points, wherein the CSI-RS transmit information is used to indicate to the M access points to periodically send a CSI-RS to a first user equipment at a preset interval, wherein the preset interval is a time interval and/or a subband interval, and wherein M is an integer greater than 1; and
    obtaining, by the network side device, channel state information (CSI) corresponding to each of the M access points, wherein the CSI corresponding to each access point, of the M access points, comprises first CSI, and wherein the first CSI is information that is measured based on the CSI-RS corresponding to the access point and fed back by the first user equipment, wherein a precoding matrix indicator (PMI) in the CSI corresponding to the access point is fed back, in accordance with the preset interval being the subband interval, at a granularity of a subband.

2. The measurement method according to claim 1, wherein periodically sending, in accordance with the preset interval being the subband interval and by the M access points, the CSI-RS to the first user equipment at the preset interval comprises:
    sending, by the M access points, the CSI-RS in polling mode in any system bandwidth at the subband interval.

3. The measurement method according to claim 1, wherein periodically sending, by the M access points, the CSI-RS to the first user equipment at the preset interval comprises:
    periodically sending, by the M access points or K joint access point groups, the CSI-RS to the first user equipment at the preset interval,
    wherein the K joint access point groups are obtained by dividing the M access points into K groups,
    wherein access points in any one of the K joint access point groups are configured to jointly send the CSI-RS, and
    wherein K is a positive integer.

4. The measurement method according to claim 3, wherein the periodically sending, in accordance with the preset interval being the subband interval and by the M access points or K joint access point groups, the CSI-RS to the first user equipment at the preset interval comprises:
    sending, by the M access points or the K joint access point groups, the CSI-RS in polling mode in any system bandwidth at the subband interval.

5. The measurement method according to claim 3, wherein the periodically sending, by the M access points or K joint access point groups, the CSI-RS to the first user equipment at the preset interval comprises:
    determining a reference antenna of each access point in a first joint access point group; and
    mapping each port in a first CSI-RS to the reference antenna of the access point in the first joint access point group,
    wherein the reference antenna of the access point in the first joint access point group is mapped to at least one port.

6. The measurement method according to claim 3, wherein the obtaining, by the network side device, channel state information CSI corresponding to each of the M access points comprises:
    obtaining, by the network side device, first joint CSI, wherein the first joint CSI is information that is measured based on a first joint CSI-RS and fed back by the first user equipment, and wherein the first joint CSI-RS is a CSI-RS jointly sent by access points in a first joint access point group in the K joint access point groups; and
    wherein the measurement method comprises:
        determining, based on rank indicators (RIs) and precoding matrix indicators (PMIs) in CSI corresponding to access points in a working set corresponding to the first user equipment and a PMI in CSI corresponding to the first joint access point group, a joint weight of coherent joint transmission corresponding to the working set, wherein the first joint access point group comprises the access points in the working set.

7. A channel state information measurement apparatus, comprising:
    a processor; and
    a non-transitory computer-readable medium including computer-executable instructions that, when executed by the processor, facilitate performing a channel state information measurement method comprising:
configuring channel state information reference signal (CSI-RS) transmit information of M access points, wherein the CSI-RS transmit information is used to indicate to the M access points to periodically send a CSI-RS to a first user equipment at a preset interval, wherein the preset interval is a time interval and/or a subband interval, and wherein M is an integer greater than 1; and
obtaining channel state information (CSI) corresponding to each of the M access points, wherein the CSI corresponding to the each access point, of the M access points, comprises first CSI, and wherein the first CSI is information that is measured based on the CSI-RS corresponding to the access point and fed back by the first user equipment,
wherein a precoding matrix indicator (PMI) in the CSI corresponding to the access point is fed back, in accordance with the preset interval being the subband interval, at a granularity of a subband.

8. The measurement apparatus according to claim 7, wherein periodically sending, in accordance with the preset interval being the subband interval and by the M access points, the CSI-RS to the first user equipment at the preset interval comprises:
sending, by the M access points, the CSI-RS in polling mode in any system bandwidth at the subband interval.

9. The measurement apparatus according to claim 7, wherein periodically sending, by the M access points, the CSI-RS to the first user equipment at the preset interval comprises:
periodically sending, by the M access points or K joint access point groups, the CSI-RS to the first user equipment at the preset interval,
wherein the K joint access point groups are obtained by dividing the M access points into K groups,
wherein access points in any one of the K joint access point groups are configured to jointly send the CSI-RS, and
wherein K is a positive integer.

10. The measurement apparatus according to claim 9, wherein the periodically sending, in accordance with the preset interval being the subband interval and by the M access points or K joint access point groups, the CSI-RS to the first user equipment at the preset interval comprises:
sending, by the M access points or the K joint access point groups, the CSI-RS in polling mode in any system bandwidth at the subband interval.

11. The measurement apparatus according to claim 9, wherein the periodically sending, by the M access points or K joint access point groups, the CSI-RS to the first user equipment at the preset interval comprises:
determining a reference antenna of each access point in a first joint access point group; and
mapping each port in a first CSI-RS to the reference antenna of the access point in the first joint access point group,
wherein the reference antenna of the access point in the first joint access point group is mapped to at least one port.

12. The measurement apparatus according to claim 9, wherein the obtaining channel state information CSI corresponding to each of the M access points comprises:
obtaining first joint CSI, wherein the first joint CSI is information that is measured based on a first joint CSI-RS and fed back by the first user equipment, and the first joint CSI-RS is a CSI-RS jointly sent by access points in a first joint access point group in the K joint access point groups; and
wherein the measurement method further comprises:
determining, based on rank indicators (RIs) and precoding matrix indicators (PMIs) in CSI corresponding to access points in a working set corresponding to the first user equipment and a PMI in CSI corresponding to the first joint access point group, a joint weight of coherent joint transmission corresponding to the working set, wherein the first joint access point group comprises the access points in the working set.

13. A non-transitory memory storage medium comprising computer-executable instructions that, when executed, facilitate a network side device carrying out operations of a channel state information measurement method comprising:
configuring, by a network side device, channel state information reference signal (CSI-RS) transmit information of M access points, wherein the CSI-RS transmit information is used to indicate the M access points to periodically send a CSI-RS to a first user equipment at a preset interval, wherein the preset interval is a time interval and/or a subband interval, and wherein M is an integer greater than 1; and
obtaining, by the network side device, channel state information (CSI) corresponding to each of the M access points, wherein the CSI corresponding to the access point, of the M access points, comprises first CSI, and wherein the first CSI is information that is measured based on the CSI-RS corresponding to the access point and fed back by the first user equipment,
wherein a precoding matrix indicator (PMI) in the CSI corresponding to the access point is fed back, in accordance with the preset interval being the subband interval, at a granularity of a subband.

14. The non-transitory memory storage medium according to claim 13, wherein periodically sending, in accordance with the preset interval being the subband interval and by the M access points, the CSI-RS to the first user equipment at the preset interval comprises:
sending, by the M access points, the CSI-RS in polling mode in any system bandwidth at the subband interval.

15. The non-transitory memory storage medium according to claim 13, wherein periodically sending, by the M access points, the CSI-RS to the first user equipment at the preset interval comprises:
periodically sending, by the M access points or K joint access point groups, the CSI-RS to the first user equipment at the preset interval,
wherein the K joint access point groups are obtained by dividing the M access points into K groups,
wherein access points in any one of the K joint access point groups are configured to jointly send the CSI-RS, and
wherein K is a positive integer.

16. The non-transitory memory storage medium according to claim 15, wherein the periodically sending, in accordance with the preset interval being the subband interval and by the M access points or K joint access point groups, the CSI-RS to the first user equipment at the preset interval comprises:
sending, by the M access points or the K joint access point groups, the CSI-RS in polling mode in any system bandwidth at the subband interval.

17. The non-transitory memory storage medium according to claim 15, wherein the periodically sending, by the M access points or K joint access point groups, the CSI-RS to the first user equipment at the preset interval comprises:
  determining a reference antenna of each access point in a first joint access point group; and
  mapping each port in a first CSI-RS to the reference antenna of the access point in the first joint access point group,
  wherein the reference antenna of the access point in the first joint access point group is mapped to at least one port.

18. The non-transitory memory storage medium according to claim 15, wherein the obtaining, by the network side device, channel state information CSI corresponding to each of the M access points comprises:
  obtaining, by the network side device, first joint CSI, wherein the first joint CSI is information that is measured based on a first joint CSI-RS and fed back by the first user equipment, and wherein the first joint CSI-RS is a CSI-RS jointly sent by access points in a first joint access point group in the K joint access point groups; and
  wherein the measurement method comprises:
    determining, based on rank indicators (RIs) and precoding matrix indicators (PMIs) in CSI corresponding to access points in a working set corresponding to the first user equipment and a PMI in CSI corresponding to the first joint access point group, a joint weight of coherent joint transmission corresponding to the working set, wherein the first joint access point group comprises the access points in the working set.

* * * * *

UNITED STATES PATENT AND TRADEMARK OFFICE
CERTIFICATE OF CORRECTION

PATENT NO. : 11,817,929 B2
APPLICATION NO. : 17/484936
DATED : November 14, 2023
INVENTOR(S) : Sun et al.

It is certified that error appears in the above-identified patent and that said Letters Patent is hereby corrected as shown below:

In the Claims

Claim 7: Column 41, Line 13: "corresponding to the each access point, of the M access" should read -- corresponding to each access point, of the M access --.

Signed and Sealed this
Twenty-seventh Day of February, 2024

Katherine Kelly Vidal
*Director of the United States Patent and Trademark Office*